US012240464B2

(12) United States Patent
Omagari et al.

(10) Patent No.: US 12,240,464 B2
(45) Date of Patent: Mar. 4, 2025

(54) TRAVELING ROUTE GENERATION APPARATUS AND TRAVELING ROUTE GENERATION METHOD

(71) Applicant: Mitsubishi Electric Corporation, Tokyo (JP)

(72) Inventors: Yuko Omagari, Tokyo (JP); Masaya Endo, Tokyo (JP); Tomoki Uno, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 240 days.

(21) Appl. No.: 18/006,786

(22) PCT Filed: Sep. 30, 2020

(86) PCT No.: PCT/JP2020/037070
§ 371 (c)(1),
(2) Date: Jan. 25, 2023

(87) PCT Pub. No.: WO2022/070290
PCT Pub. Date: Apr. 7, 2022

(65) Prior Publication Data
US 2023/0294700 A1    Sep. 21, 2023

(51) Int. Cl.
*B60W 30/18*    (2012.01)
*B60W 10/20*    (2006.01)
(Continued)

(52) U.S. Cl.
CPC ...... *B60W 30/18163* (2013.01); *B60W 10/20* (2013.01); *B60W 30/12* (2013.01); *G06V 20/588* (2022.01); *B60W 2552/53* (2020.02)

(58) Field of Classification Search
CPC ............ B60W 10/20; B60W 2552/10; B60W 2552/30; B60W 2552/53; B60W 30/12;
(Continued)

(56) References Cited

U.S. PATENT DOCUMENTS 5,039,979 A * 8/1991 McClive .................. E01F 9/30
340/901
5,913,375 A * 6/1999 Nishikawa ............... B62D 6/00
701/28

(Continued)

FOREIGN PATENT DOCUMENTS

JP    2017-056779 A    3/2017

OTHER PUBLICATIONS

International Search Report for PCT/JP2020/037070 dated Dec. 8, 2020 (PCT/ISA/210).

*Primary Examiner* — Carl C Staubach
(74) *Attorney, Agent, or Firm* — Sughrue Mion, PLLC

(57) ABSTRACT

To provide a travel route generation apparatus and a travel route generation method which can generate a travel route for changing lanes with good accuracy using the newest lane marking information obtained during lane change. A travel route generation apparatus and a travel route generation method, during lane change of the own vehicle, determines whether or not the lane marking information of each lane marking is effective lane marking information which can be used for generation of a lane change travel route which is a travel route for changing lanes; selects a reference lane marking from the lane marking on the left side and the lane marking on the right side of an own lane, based on an effectiveness determination result; and generates a lane change travel route, based on the lane marking information of the reference lane marking.

10 Claims, 15 Drawing Sheets

(51) Int. Cl.
*B60W 30/12* (2020.01)
*G06V 20/56* (2022.01)

(58) Field of Classification Search
CPC .......... B60W 30/18163; B60W 60/001; G06V 20/588
See application file for complete search history.

(56) References Cited

U.S. PATENT DOCUMENTS

| | | | | |
|---|---|---|---|---|
| 9,499,197 | B2* | 11/2016 | Tan | B62D 6/00 |
| 10,713,952 | B2* | 7/2020 | Ogawa | B60W 40/06 |
| 11,529,956 | B2* | 12/2022 | Kim | B60W 50/082 |
| 11,608,067 | B2* | 3/2023 | Xu | B60W 40/06 |
| 12,046,052 | B2* | 7/2024 | Kim | G01S 17/931 |
| 2007/0233343 | A1* | 10/2007 | Saito | B62D 1/28 |
| | | | | 701/41 |
| 2009/0201370 | A1* | 8/2009 | Otsuka | G06V 20/588 |
| | | | | 348/148 |
| 2016/0225261 | A1* | 8/2016 | Matsumoto | G08G 1/167 |
| 2017/0061799 | A1* | 3/2017 | Fujii | G08G 1/167 |
| 2018/0297639 | A1* | 10/2018 | Fujii | G05D 1/0246 |
| 2018/0297640 | A1* | 10/2018 | Fujii | B62D 6/04 |
| 2018/0299887 | A1* | 10/2018 | Cashler | B60W 30/18163 |
| 2018/0348779 | A1* | 12/2018 | Oniwa | B60T 8/17557 |
| 2019/0061819 | A1* | 2/2019 | Park | G05D 1/0212 |
| 2019/0096258 | A1* | 3/2019 | Ide | B62D 15/025 |
| 2022/0204054 | A1* | 6/2022 | Taniguchi | G08G 1/167 |
| 2023/0082350 | A1* | 3/2023 | Endo | G06V 20/588 |
| | | | | 701/41 |
| 2023/0294700 | A1* | 9/2023 | Omagari | B60W 30/18163 |
| | | | | 701/41 |

* cited by examiner

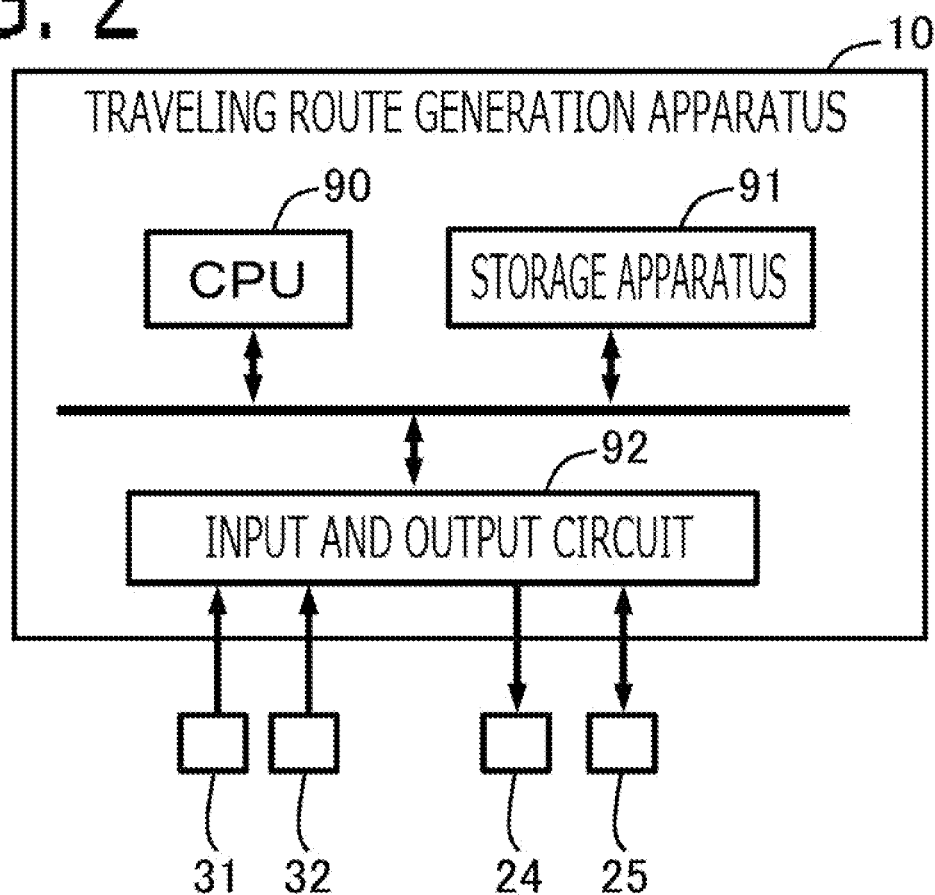
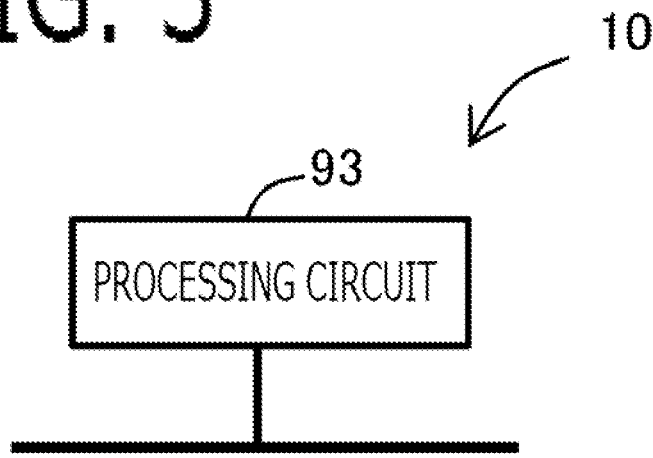

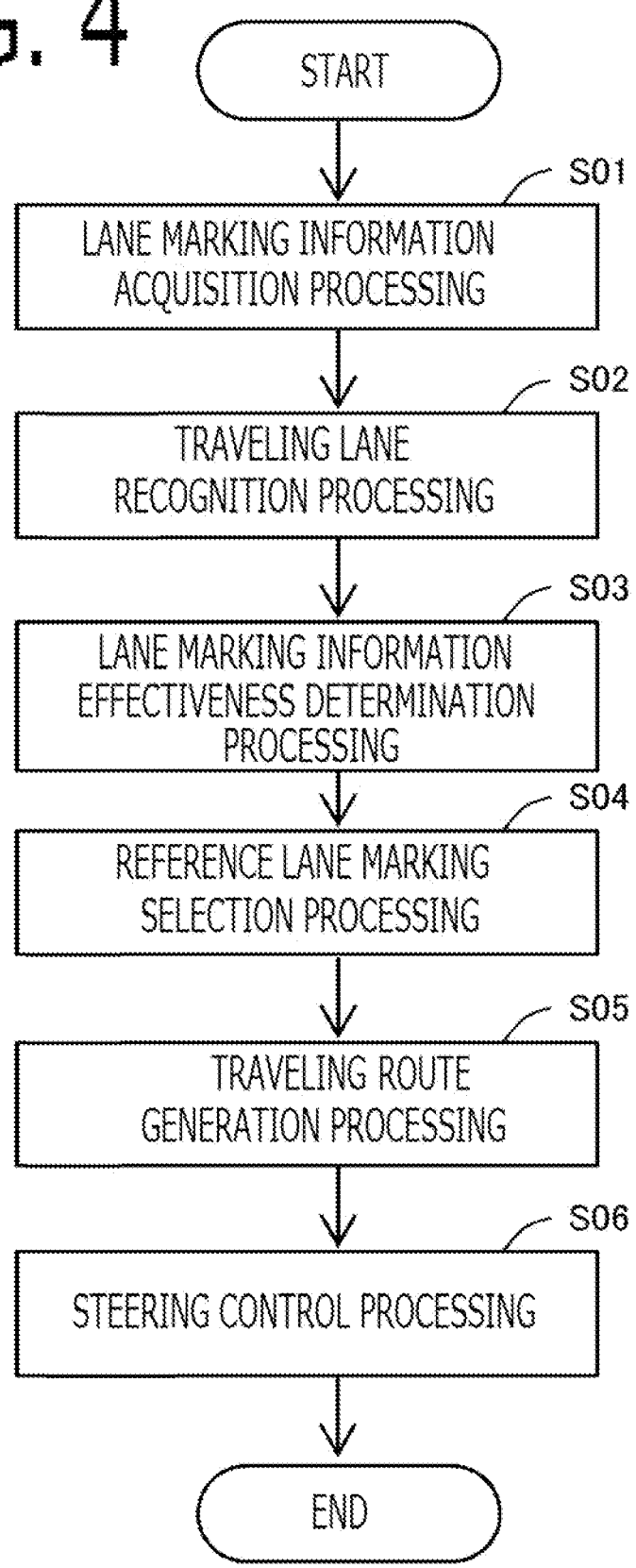

FIG. 11

| TIME | L2 | L1 | R1 | R2 | |
|---|---|---|---|---|---|
| ... | ... | ... | ... | ... | ... |
| t0 | NOT EFFECTIVE | EFFECTIVE | EFFECTIVE | NOT EFFECTIVE | ... |
| ... | ... | ... | ... | ... | ... |
| t1 | EFFECTIVE | EFFECTIVE | NOT EFFECTIVE | — | ... |
| ... | ... | ... | ... | ... | ... |

TRAVELING ROUTE GENERATION APPARATUS AND TRAVELING ROUTE GENERATION METHOD

CROSS REFERENCE TO RELATED APPLICATIONS

This application is a National Stage of International Application No. PCT/JP2020/037070, filed on Sep. 30, 2020.

TECHNICAL FIELD

The present disclosure is related with a traveling route generation apparatus and a traveling route generation method.

BACKGROUND ART

Previously, a vehicle control apparatus which generates a traveling route for changing lanes, and makes an own vehicle change lanes is known. For example, in patent document 1, a traveling route for changing lanes is previously generated at the time of lane change start, based on the lane marking information of the lane change destination acquired at the time of lane change start.

CITATION LIST

Patent Literature

Patent document 1: JP 2017-056779 A

SUMMARY OF INVENTION

Technical Problem

However, accuracy of the lane marking information ahead of the maximum distance where the camera or the radar can detect is low; and reliability of distant part in the traveling route previously generated at the time of lane change start like patent document 1 is low. When the lane marking information cannot be acquired due to an obstacle or the like at the time of lane change start, accuracy of the traveling route previously generated at the time of lane change start is low.

Then, the purpose of the present disclosure is to provide a traveling route generation apparatus and a traveling route generation method which can generate a traveling route for changing lanes with good accuracy using the newest lane marking information obtained during lane change.

Solution to Problem

A traveling route generation apparatus according to the present disclosure, including:
  a lane marking information acquisition unit that acquires lane marking information regarding position and shape of each lane marking on a basis of a position of an own vehicle, about lane markings of one or a plurality of lanes which can be recognized in front of the own vehicle and includes an own lane which is a lane where the own vehicle is traveling and a lane adjacent to the own lane;
  a traveling lane recognition unit that determines a correspondence relation between each lane marking and the own lane, based on the lane marking information of each lane marking;
  a lane marking information effectiveness determination unit that, during lane change of the own vehicle, determines whether or not the lane marking information of each lane marking is effective lane marking information which can be used for generation of a lane change traveling route which is a traveling route for changing lanes;
  a reference lane marking selection unit that, during lane change, selects one lane marking from a lane marking on a left side and a lane marking on a right side of the own lane, as a reference lane marking, based on an effectiveness determination result of the lane marking information of each lane marking by the lane marking information effectiveness determination unit; and
  a traveling route generation unit that, during lane change, generates the lane change traveling route which is a traveling route for changing lanes, based on the lane marking information of the reference lane marking.

A traveling route generation method according to the present disclosure, including:
  a lane marking information acquisition step of acquiring lane marking information regarding position and shape of each lane marking on a basis of a position of an own vehicle, about lane markings of one or a plurality of lanes which can be recognized in front of the own vehicle and include an own lane which is a lane where the own vehicle is traveling, and a lane adjacent to the own lane;
  a traveling lane recognition step of determining a correspondence relation between each lane marking and the own lane, based on the lane marking information of each lane marking;
  a lane marking information effectiveness determination step of, during lane change of the own vehicle, determining whether or not the lane marking information of each lane marking is effective lane marking information which can be used for generation of a lane change traveling route which is a traveling route for changing lanes;
  a reference lane marking selection step of, during lane change, selecting one lane marking from a lane marking on a left side and a lane marking on a right side of the own lane, as a reference lane marking, based on an effectiveness determination result of the lane marking information of each lane marking in the lane marking information effectiveness determination step; and
  a traveling route generation step of, during lane change, generating the lane change traveling route which is a traveling route for changing lanes, based on the lane marking information of the reference lane marking.

Advantage of Invention

According to the traveling route generation apparatus and the traveling route generation method of the present disclosure, the lane change traveling route is generated, based on the newest lane marking information of each lane marking successively obtained during lane change, and the lane marking information of the reference lane marking selected from the lane markings on the left side and the right side of the own lane based on the effectiveness determination result. Accordingly, based on the lane marking information of the newest own lane obtained successively during lane change, the lane change traveling route can be generated with good accuracy.

BRIEF DESCRIPTION OF THE DRAWINGS

FIG. 2 is a hardware configuration figure of the traveling route generation apparatus according to Embodiment 1;

FIG. 3 is a hardware configuration figure of the traveling route generation apparatus according to Embodiment 1;

FIG. 4 is a flowchart for explaining the schematic processing of the traveling route generation apparatus according to Embodiment 1;

FIG. 11 is a figure for explaining result of effectiveness determination of the lane marking information according to Embodiment 1;

DETAILED DESCRIPTION OF THE EMBODIMENTS

Embodiment 1

Figure 1:
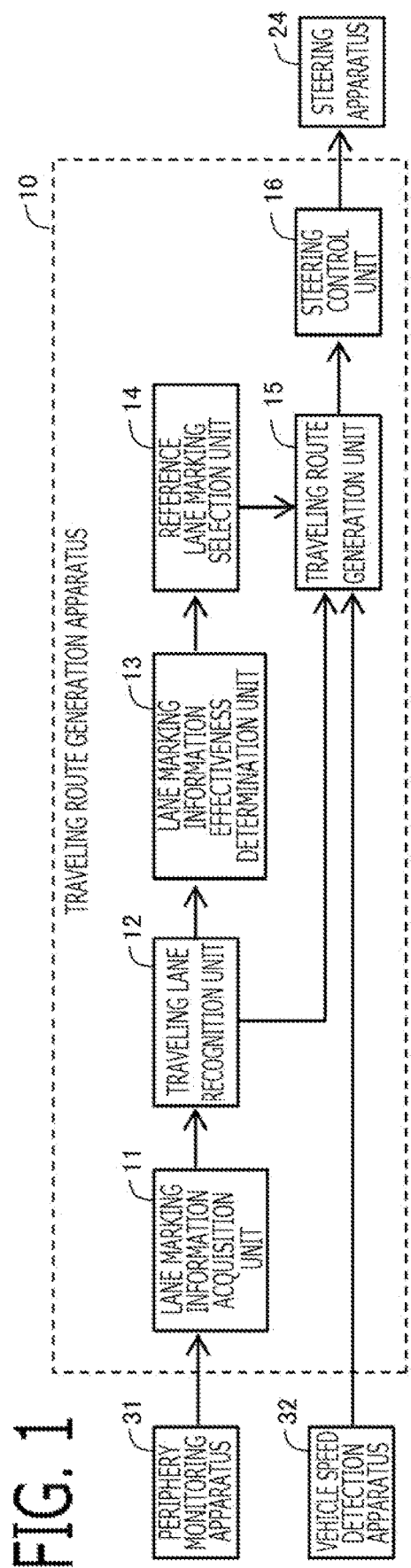
FIG. 1 is a schematic block diagram of the traveling route generation apparatus according to Embodiment 1.

A traveling route generation apparatus 10 and a traveling route generation method according to Embodiment 1 will be explained with reference to drawings. FIG. 1 is a schematic block diagram of the traveling route generation apparatus 10.

The traveling route generation apparatus 10 is provided with processing units such as a lane marking information acquisition unit 11, a traveling lane recognition unit 12, a lane marking information effectiveness determination unit 13, a reference lane marking selection unit 14, a traveling route generation unit 15, a steering control unit 16, and the like. Each processing of the traveling route generation apparatus 10 is realized by processing circuits which is provided in the traveling route generation apparatus 10. As shown in FIG. 2, specifically, the traveling route generation apparatus 10 is provided with an arithmetic processor 90 such as CPU (Central Processing Unit), storage apparatuses 91, an input and output circuit 92 which outputs and inputs external signals to the arithmetic processor 90, and the like.

As the arithmetic processor 90, ASIC (Application Specific Integrated Circuit), IC (Integrated Circuit), DSP (Digital Signal Processor), FPGA (Field Programmable Gate Array), GPU (Graphics Processing Unit), AI (Artificial Intelligence) chip, various kinds of logical circuits, various kinds of signal processing circuits, and the like may be provided. As the arithmetic processor 90, a plurality of the same type ones or the different type ones may be provided, and each processing may be shared and executed. As the storage apparatuses 91, a RAM (Random Access Memory) which can read data and write data from the arithmetic processor 90, a ROM (Read Only Memory) which can read data from the arithmetic processor 90, and the like are provided. As the storage apparatuses 91, various kinds of storage apparatus, such as a flash memory, EEPROM (Electrically Erasable Programmable Read Only Memory), a hard disk, and a DVD apparatus may be used.

The input and output circuit 92 is provided with a communication device, an A/D converter, an input/output port, a driving circuit, and the like. The input and output circuit 92 is connected to a periphery monitoring apparatus 31, a vehicle speed detection apparatus 32, a steering apparatus 24, a driving support system 25, and the like, and communicates with these apparatuses.

Then, the arithmetic processor 90 runs software items (programs) stored in the storage apparatus 91 such as a ROM and collaborates with other hardware devices in the traveling route generation apparatus 10, such as the storage apparatus 91, and the input and output circuit 92, so that the respective functions of the 11 to 16 included in the traveling route generation apparatus 10 are realized. Setting data items such as a determination value to be utilized in the processing units 11 to 16 are stored, as part of software items (programs), in the storage apparatus 91 such as a ROM. Each function of the traveling route generation apparatus 10 will be explained in detail below.

Alternatively, as shown in FIG. 3, the traveling route generation apparatus 10 may be provided with a dedicated hardware 93 as the processing circuit, for example, a single circuit, a combined circuit, a programmed processor, a parallel programmed processor, ASIC, FPGA, GPU, AI chip, or a circuit which combined these.

FIG. 4 is a schematic flowchart for explaining the procedure (the traveling lane recognition method) of processing of the traveling route generation apparatus 10 according to the present embodiment. The processing of the flowchart in FIG. 4 is recurrently executed every predetermined operation period by the arithmetic processor 90 executing software (a program) stored in the storage apparatus 91. The calculation period is set to 0.01 seconds, for example.

1. Lane Marking Information Acquisition Unit 11

In the step S01 of FIG. 4, the lane marking information acquisition unit 11 executes a lane marking information acquisition processing (a lane marking information acquisition step) that acquires lane marking information regarding position and shape of each lane marking on a basis of a position of an own vehicle, about lane markings of one or a plurality of lanes which can be recognized in front of the own vehicle and include an own lane which is a lane where the own vehicle is traveling, and a lane adjacent to the own lane.

The lane marking information acquisition unit 11 detects the lane marking which can be recognized, and acquires lane marking information, based on detection information of the periphery monitoring apparatus 31. The periphery monitoring apparatus 31 includes a camera, a radar, and the like which monitor the front of the own vehicle. Various kinds of well-known image processing is performed to picture imaged by the camera, and the lane marking of lane is recognized. Although the lane marking is mainly a white line, it is not limited to the white line, and a roadside object, such as a guardrail, a pole, a road shoulder, and a wall, may be recognized as the lane marking. As the periphery monitoring apparatus 31, a laser radar may be used, and the white line may be recognized from the points that the reflection luminance of the laser radar is high.

Figure 5:
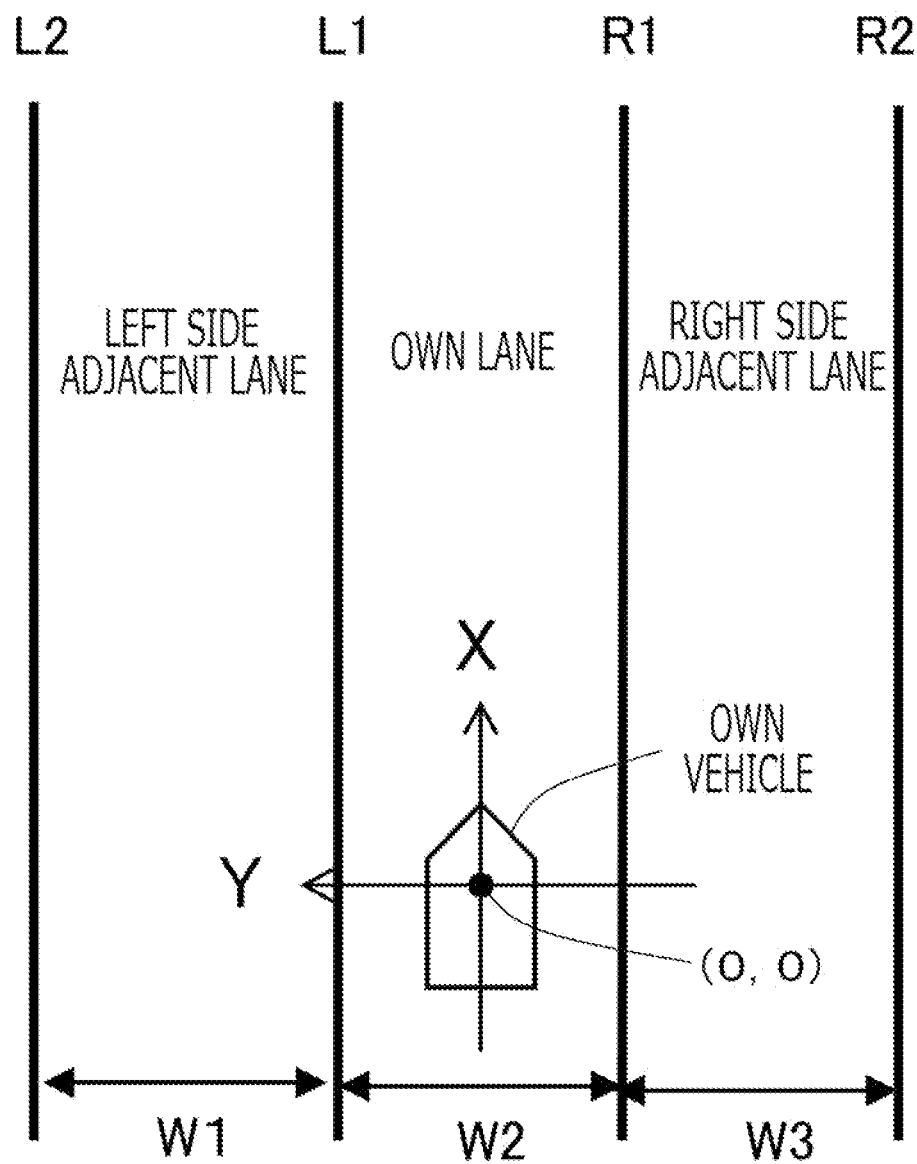
FIG. 5 is a figure for explaining the own vehicle coordinate system according to Embodiment 1.

The lane marking information acquisition unit 11 acquires the lane marking information regarding position and shape of each recognized lane marking in the own vehicle coordinate system. As shown in FIG. 5, the own vehicle coordinate system is a coordinate system which sets the front direction and the lateral direction of the own vehicle as two coordinate axes X and Y. The origin of the own vehicle coordinate system is set at a center of the own vehicle, such as a neutral steer point. The left side of the lateral direction is positive and the right side is negative.

Figure 6:
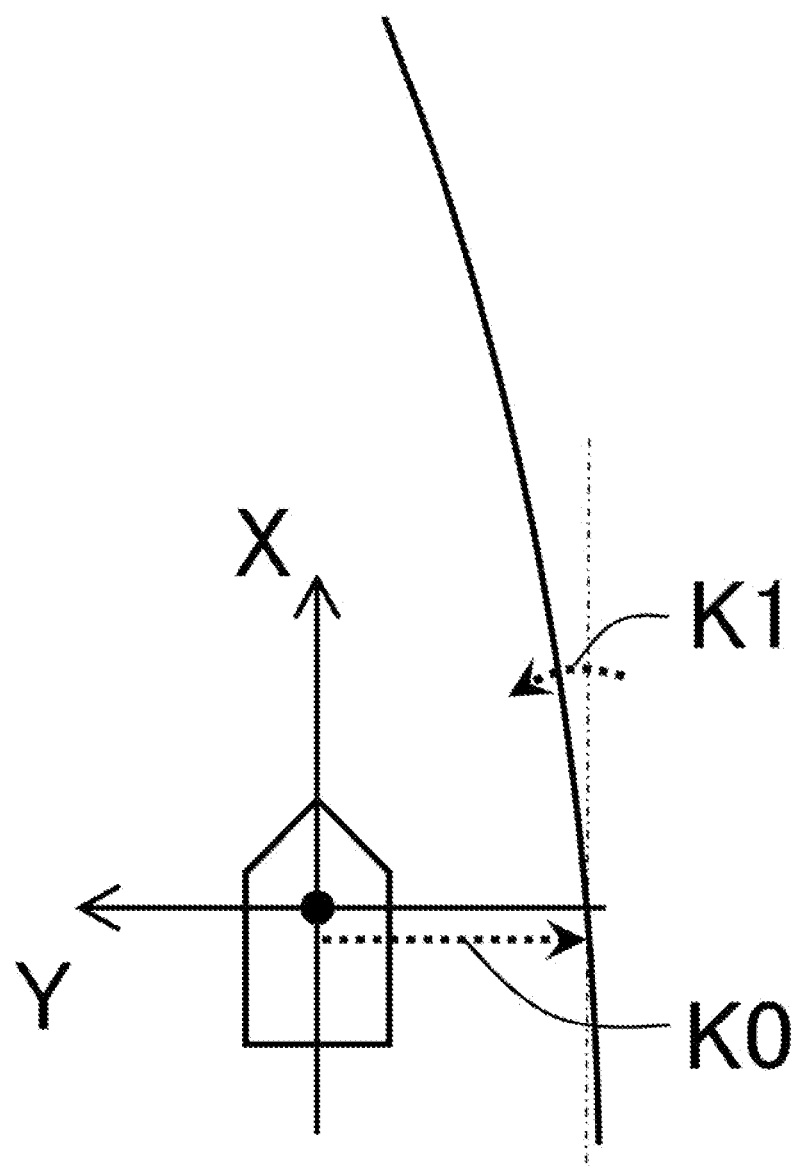
FIG. 6 is a figure explaining the lane marking information according to Embodiment 1.

In the present embodiment, as shown in FIG. 6, the lane marking information acquisition unit 11 acquires, as the lane marking information of the each lane marking, information including a lane marking distance K0 which is a distance between the own vehicle and a part of the lane marking located in the lateral direction of the own vehicle, a lane marking angle K1 which is an inclination of the part of the lane marking located in the lateral direction of the own vehicle with respect to the front direction of the own vehicle, and a curvature K2 of the lane marking. In the present embodiment, a curvature change rate K3 of lane marking is further included in the lane marking information. Using these parameters K0 to K3 of the lane marking information, the position of each lane marking in the own vehicle coordinate system can be calculated by the next equation. That is to say, each lane marking is approximated by an approximation equation expressed by a third-order polynomial which sets the position Y in the lateral direction and the position X in the front direction of the lane marking in the own vehicle coordinate system as variables. Each order coefficient is acquired as the parameters K0 to K3 indicating the lane marking information. It may be approximated by a second-order polynomial which does not have the third-order term of the curvature change rate K3.

[Equation 1]
$$Y = K0 + K1 \times X + \frac{1}{2} \times K2 \times X^2 + \frac{1}{6} \times K3 \times X^3 \tag{1}$$

As shown in FIG. 5, the lane marking information acquisition unit 11 acquires the lane marking information of not only right and left lane markings of the own lane but also a lane marking of a lane adjacent to the own lane.

<Information Used for Determination of Effectiveness>

The lane marking information acquisition unit 11 transmits information regarding an accuracy of the lane marking information of each lane marking, to the lane marking information effectiveness determination unit 13. For example, information on a length (in this example, distance in front of the own vehicle) of the original lane marking (white line and the like) which was detected by the periphery monitoring apparatus 31 and used for calculation of the lane marking information (in this example, coefficients K0, K1, K2, K3 of the approximated curve of the equation (1)) is transmitted to the lane marking information effectiveness determination unit 13. A coincidence degree between the original lane marking which was detected by the periphery monitoring apparatus 31 and the approximated curve, that is, information on approximate accuracy, is transmitted to the lane marking information effectiveness determination unit 13. Information on recognition probability of the detected original lane marking is also transmitted to the lane marking information effectiveness determination unit 13.

2. Traveling Lane Recognition Unit 12

In the step S02 of FIG. 4, the traveling lane recognition unit 12 executes a traveling lane recognition processing (a traveling lane recognition step) that determines a correspondence relation between each lane marking and the own lane, based on the lane marking information of each lane marking. In the present embodiment, the traveling lane recognition unit 12 also determines a correspondence relation between each lane marking and the adjacent lane which adjacent to the own lane, based on the lane marking information of each lane marking. The traveling lane recognition unit 12 determines whether or not the own vehicle crossed a lane marking which divides between the lane before lane change, and the lane after lane change, based on the lane marking information of each lane marking. When the own vehicle crosses a lane marking, the traveling lane recognition unit 12 changes the correspondence relation between each lane marking and the own lane so that the own lane is changed to a lane after crossing from a lane before crossing. A determination result is transmitted to the lane marking information effectiveness determination unit 13, the traveling route generation unit 15, and the like which are described below.

Figure 7:
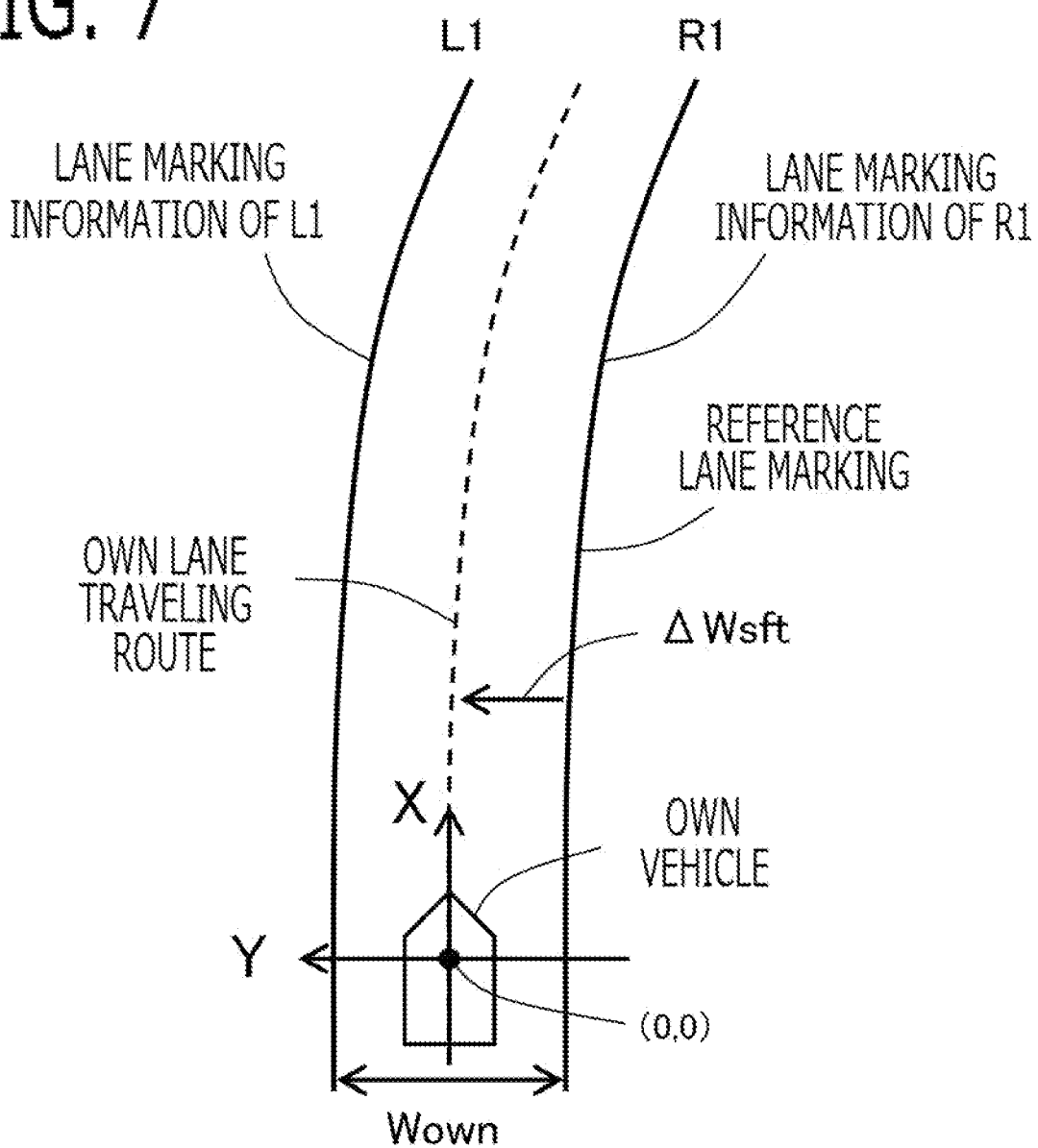
FIG. 7 is a figure explaining the lane marking information and the own vehicle traveling route of the own lane according to Embodiment 1.

In the present embodiment, as shown in FIG. 7, the traveling lane recognition unit 12 recognizes the shape of the lane marking on the left side of the own vehicle in the own vehicle coordinate system corresponding to the current position of the own vehicle, based on a lane marking information of the lane marking on the left side of the own lane (the left first lane marking L1) (in this example, the lane marking distance K0, the lane marking angle K1, the curvature of lane marking K2, and the curvature change rate of lane marking K3). The traveling lane recognition unit 12 recognizes the shape of the lane marking on the right side of the own vehicle, based on the lane marking information on the lane marking on the right side of the own lane (the right first lane marking R1) (in this example, the lane marking distance K0, the lane marking angle K1, the curvature of lane marking K2, and the curvature change rate of lane marking K3).

<Recognition of Each Lane Marking of Right Side and Left Side Based on Lane Marking Distance K0>

The traveling lane recognition unit 12 recognizes the correspondence relation between the own lane and each lane marking, based on the lane marking distance K0 of each lane marking acquired this time.

The traveling lane recognition unit 12 recognizes the lane marking which is closest to the own vehicle on the right side of the own vehicle among the lane marking distances K0 of the respective lane markings, as the lane marking on the right side of the own lane (the right first lane marking R1); and recognizes the lane marking which is closest to the own vehicle on the left side of the own vehicle among the lane marking distances K0 of the respective lane markings, as the lane marking on the left side of the own lane (the left first lane marking L1).

In the present embodiment, the traveling lane recognition unit 12 recognizes the lane marking whose lane marking distance K0 is the smallest among the lane markings whose lane marking distances K0 are positive values, as the left first lane marking L1 corresponding to the left side lane marking of the own lane; recognizes the lane marking whose lane marking distance K0 is the second smallest, as the left second lane marking L2; and recognizes the lane marking whose lane marking distance K0 is the third smallest, as the left third lane marking L3. The traveling lane recognition unit 12 recognizes the lane marking whose absolute value of lane marking distance K0 is the smallest among the lane markings whose lane marking distance K0 are negative values, as the right first lane marking R1 corresponding to the right side lane marking of the own lane; recognizes the lane marking whose absolute value of lane marking distance K0 is the second smallest, as the right second lane marking R2; and recognizes the lane marking whose absolute value of lane marking distance K0 is the third smallest, as the right third lane marking R3.

Figure 8:
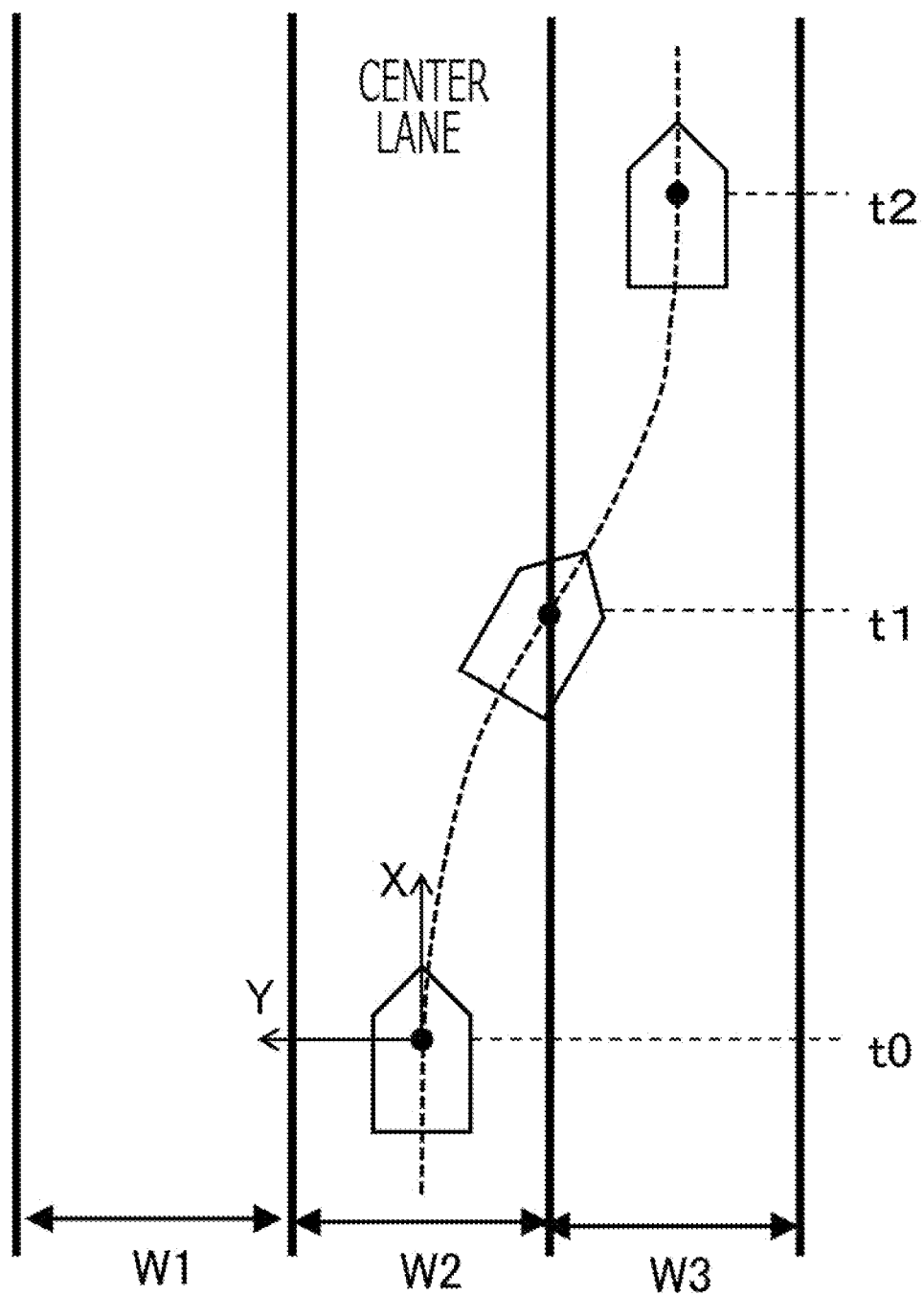
FIG. 8 is a figure explaining the lane change according to Embodiment 1.
Figure 9:
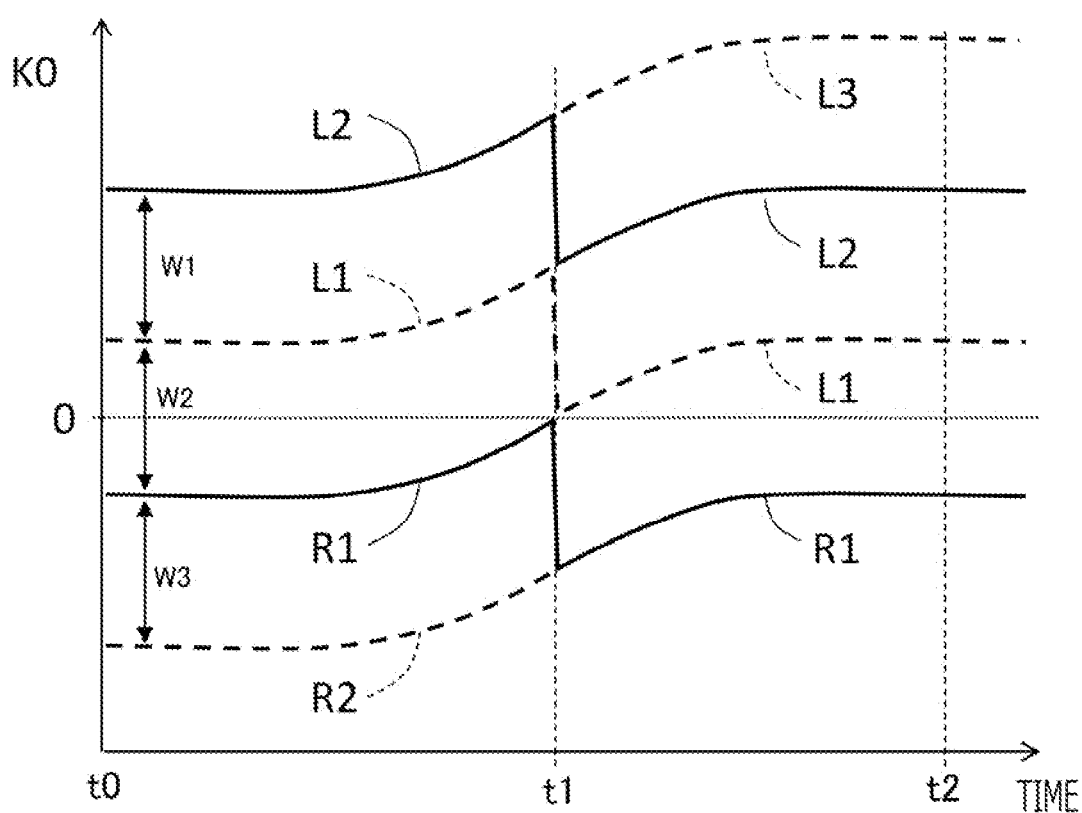
FIG. 9 is a time chart explaining change of the correspondence relation between the own lane and each lane marking by the lane change according to Embodiment 1.

FIG. 8 and FIG. 9 show a behavior when the own vehicle which was traveling in the center lane of the three lanes on one side carries out a lane change to the right side lane. FIG. 8 shows the behavior of the own vehicle on the basis of the road, and FIG. 9 shows the time chart of the lane marking distance K0 of each lane marking. At the time t0, the own vehicle is traveling in the center lane. The lane marking distance K0 of the left first lane marking L1 and the lane marking distance K0 of the right first lane marking R1 become a half of the lane width W2 of the center lane. After that, since a lane change to the right side was started, the absolute value of the lane marking distance K0 of the right first lane marking R1 is decreasing, and the lane marking distance K0 of the left first lane marking L1 is increasing.

Then, at the time t1, the lane marking distance K0 of the lane marking which was recognized as the right first lane marking R1 becomes a positive value and becomes the lane marking whose lane marking distance K0 is the smallest among the lane markings whose lane marking distances K0 are positive values, and it is recognized as the left first lane marking L1. At the time t1, the lane marking distance K0 of the lane marking which was recognized as the left first lane marking L1 becomes the lane marking whose lane marking distance K0 is the second smallest among the lane markings whose lane marking distances K0 are positive values, and it is recognized as the left second lane marking L2. At the time t1, the lane marking distance K0 of the lane marking which was recognized as the right second lane marking R2 becomes the lane marking whose absolute value of lane marking distance K0 is the smallest among the lane markings whose lane marking distances K0 are negative values, and it is recognized as the right first lane marking R1.

<Crossing Determination of Lane Marking on the Right Side>

For example, as shown in the next equation, (condition 1) when a deviation $\Delta K0R1$ between the lane marking distance K0R1_old of the right first lane marking R1 acquired last time and the lane marking distance K0R1 of the right first lane marking R1 acquired this time becomes within a range corresponding to a lane width when performing the lane change to the right side lane; or, (condition 2) when a deviation $\Delta K0L1$ between the lane marking distance K0L1_old of the left first lane marking L1 acquired last time and the lane marking distance K0L1 of the left first lane marking L1 acquired this time becomes within a range corresponding to the lane width when performing the lane change to the right side lane, the traveling lane recognition unit 12 determines that the own vehicle crossed the lane marking on the right side and changed lane to the right side lane.

$\Delta K0R1 = K0R1 - K0R1\_old$ $\Delta K0L1 = K0L1 - K0L1\_old$

When $-W3-\Delta W <= \Delta K0R1 <= -W3+\Delta W$ \hfill (condition 1)

or $-W2-\Delta W <= \Delta K0L1 <= -W2+\Delta W$ \hfill (condition 2)

is established,

Determining that the own vehicle changed lane to the right side lane \hfill (2)

The range corresponding to the lane width of the condition 1 is set to from $-W3-\Delta W$ to $-W3+\Delta W$. W3 is set to the lane width of the lane which is a destination for right side lane change, for example, it is set to a deviation between the lane marking distance K0R1_old of the right first lane marking R1 acquired last time, and the lane marking distance K0R2_old of the right second lane marking R2 acquired last time. The range corresponding to the lane width of the condition 2 is set to from $-W2-\Delta W$ to $-W2+\Delta W$. W2 is set to the lane width of the own lane before lane change, for example, it is set to a deviation between the lane marking distance K0L1_old of the left first lane marking L1 acquired last time, and the lane marking distance K0R1_old of the right first lane marking R1 acquired last time. $\Delta W$ is set to a prescribed value, such as 0.1 m, or it is set to a prescribed ratio, such as 10%, of the lane width W3 or the lane width W2.

Furthermore, as shown in the next equation, (condition 1) when the lane marking distance K0R1_old of the right first lane marking R1 acquired last time is closer to 0 than a determination value $\Delta Wm$, and a deviation $\Delta K0R1$ between the lane marking distance K0R1_old of the right first lane marking R1 acquired last time and the lane marking distance K0R1 of the right first lane marking R1 acquired this time becomes within a range corresponding to a lane width when performing the lane change to the right side; or (condition 2) when the lane marking distance K0L1_old of the left first lane marking L1 acquired last time is closer to the lane width W2 than the determination value $\Delta Wm$, and a deviation $\Delta K0L1$ between the lane marking distance K0L1_old of the left first lane marking L1 acquired last time and the lane marking distance K0L1 of the left first lane marking L1 acquired this time becomes within a range corresponding to the lane width when performing the lane change to the right side, the traveling lane recognition unit 12 may determine that the own vehicle crossed the lane marking on the right side, and changed lane to the right side lane.

$\Delta K0R1 = K0R1 - K0R1\_old$ $\Delta K0L1 = K0L1 - K0L1\_old$

When $-\Delta Wm <= K0R1\_old <= \Delta Wm$ and $-W3-\Delta W <= \Delta K0R1 <= -W3+\Delta W$ \hfill (Condition 1)

or $W2-\Delta Wm <= K0L1\_old <= W2+\Delta Wm$ \hfill (Condition 2)

and $-W2-\Delta W <= \Delta K0L1 <= -W2+\Delta W$ is established,

Determining that the own vehicle changed lane to the right side lane \hfill (3)

$\Delta Wm$ may be set to the same value as $\Delta W$, or may be set to a different value. Alternatively, the speed at which the own vehicle approaches the lane marking may be calculated based on the vehicle speed and the lane marking angle K1 of the corresponding lane marking, and ΔWm and ΔW may be set according to the approach speed to the lane marking. For example, if the approach speed to the lane marking is large, a change amount of the lane marking distance K0 during the calculation period becomes large, the lane marking distance K0 changes beyond the determination range before and after crossing the lane marking, and the crossing determination of the lane marking may not be performed. However, the crossing of the lane marking can be certainly determined by changing the determination range according to the approach speed to the lane marking.

<Crossing Determination of Lane Marking on Left Side>

As shown in the next equation, (condition 3) when a deviation ΔK0L1 between the lane marking distance K0L1_old of the left first lane marking L1 acquired last time and the lane marking distance K0L1 of the left first lane marking L1 acquired this time becomes within a range corresponding to the lane width when performing the lane change to the left side lane; or (condition 4) when a deviation ΔK0R1 between the lane marking distance K0R1_old of the right first lane marking R1 acquired last time and the lane marking distance K0R1 of the right first lane marking R1 acquired this time becomes within a range corresponding to the lane width when performing the lane change to the left side lane, the traveling lane recognition unit 12 determines that the own vehicle crossed the lane marking on the left side and changed lane to the left side lane.

$$\Delta K0L1 = K0L1 - K0L1\_old$$

$$\Delta K0R1 = K0R1 - K0R1\_old$$

$$W1 - \Delta W <= \Delta K0L1 <= W1 + \Delta W$$

or $$W2 - \Delta W <= \Delta K0R1 <= W2 + \Delta W \quad \text{(Condition 4)}$$

is established,

Determining that the own vehicle changed lane to the left side lane (4)

The range corresponding to the lane width of the condition 3 is set to from W1−ΔW to W1+ΔW. W1 is set to the lane width of the lane which is a destination for left side lane change, For example, it is set to a deviation between the lane marking distance K0L2_old of the left second lane marking L2 acquired last time, and the lane marking distance K0L1_old of the left first lane marking L1 acquired last time. The range corresponding to the lane width of the condition 4 is set to from W2−ΔW to W2+ΔW. ΔW is set to a prescribed value, such as 0.1 m, or it is set to a prescribed ratio, such as 10%, of the lane width W1 or the lane width W2.

Furthermore, as shown in the next equation, (condition 3) when the lane marking distance K0L1_old of the left first lane marking L1 acquired last time is closer to 0 than the determination value ΔWm, and a deviation ΔK0L1 between the lane marking distance K0L1_old of the left first lane marking L1 acquired last time and the lane marking distance K0L1 of the left first lane marking L1 acquired this time becomes within a range corresponding to the lane width when performing the lane change to the left side; or (condition 4) when the lane marking distance K0R1_old of the right first lane marking R1 acquired last time is closer to the lane width W2 than the determination value ΔWm, and a deviation ΔK0R1 between the lane marking distance K0R1_old of the right first lane marking R1 acquired last time and the lane marking distance K0R1 of the right first lane marking R1 acquired this time becomes within a range corresponding to the lane width when performing the lane change to the left side, the traveling lane recognition unit 12 may determine that the own vehicle crossed the lane marking on the left side, and changed lane to the left side lane.

$$\Delta K0L1 = K0L1 - K0L1\_old$$

$$\Delta K0R1 = K0R1 - K0R1\_old$$

$$-\Delta Wm <= K0L1\_old <= \Delta Wm \quad \text{(Condition 3)}$$

and $W1 - \Delta W <= \Delta K0L1 <= W1 + \Delta W$ or $$-W2 - \Delta Wm <= K0R1\_old <= -W2 + \Delta Wm \quad \text{(Condition 4)}$$

and $W2 - \Delta W <= \Delta K0R1 <= W2 + \Delta W$ is established,

Determining that the own vehicle changed lane to the left side lane. (5)

3. Lane Marking Information Effectiveness Determination Unit 13

In the step S03 of FIG. 4, the lane marking information effectiveness determination unit 13 executes a lane marking information effectiveness determination processing (a lane marking information effectiveness determination step) that, during lane change of the own vehicle, determines whether or not the lane marking information of each lane marking is effective lane marking information which can be used for generation of a lane change traveling route which is a traveling route for changing lanes. During lane change, the lane marking information effectiveness determination unit 13 determines effectiveness about the lane marking information of each lane marking continuously, whenever the lane marking information of each lane marking is obtained.

In the present embodiment, it is assumed that the driving support system 25 which performs the lane change automatically is mounted. When the driving support system 25 determines to carry out the lane change to the right side lane or the left side lane for traveling to the destination or according to the periphery traveling state, and is executing the lane change, it is determined that it is during execution of the lane change. The driving support system 25 turns on the direction indicator corresponding to its lane change direction, when the execution of lane change is determined.

If a system which performs driving support of lane change by setting a lane change instruction of driver as a starting point is assumed, when there is a requirement of lane change of driver detected by operation of the direction indicator or other means, it is determined that it is during execution of the lane change.

Figure 10:
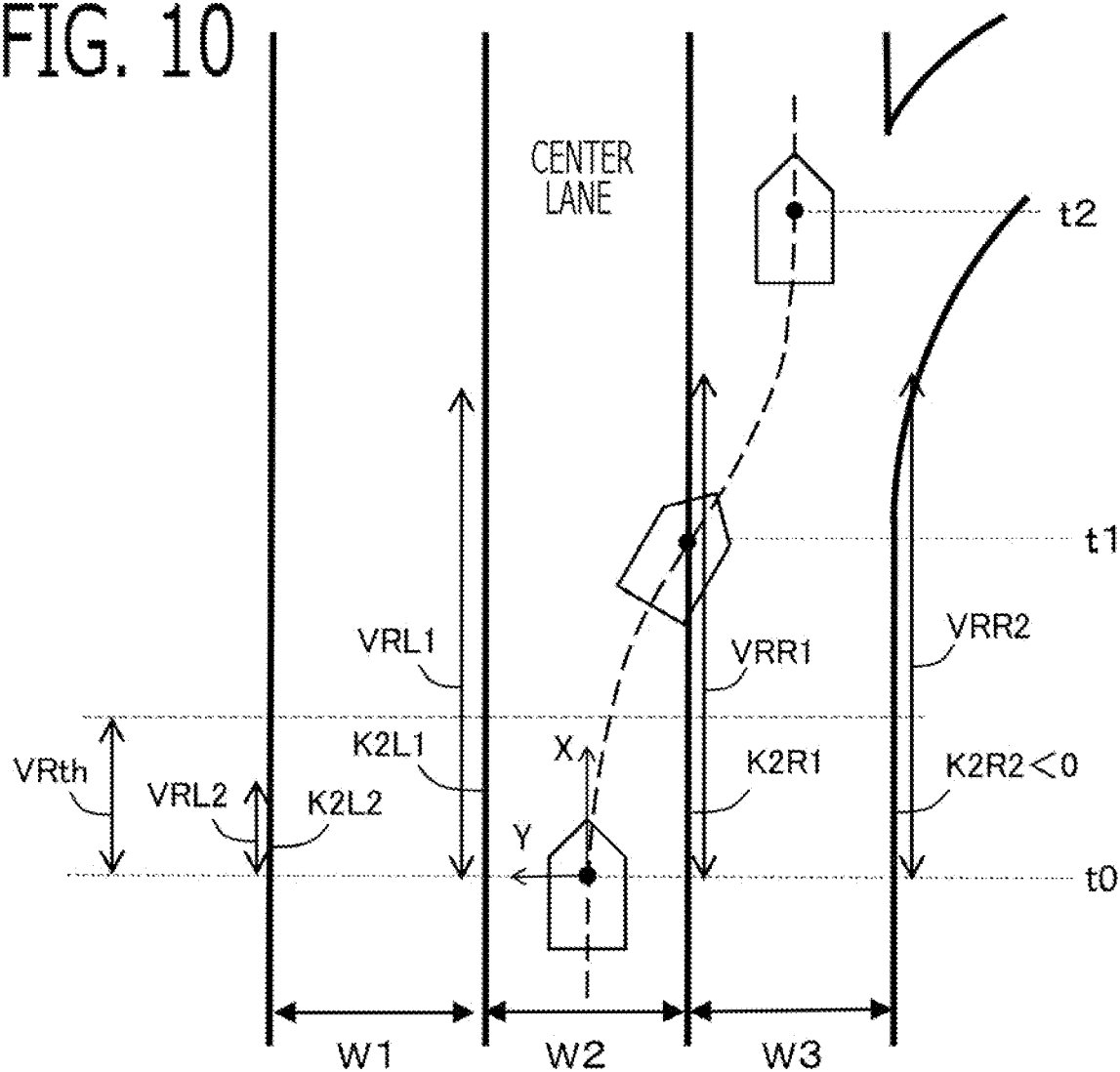
FIG. 10 is a figure for explaining effectiveness determination of the lane marking information according to Embodiment 1.

The lane marking information effectiveness determination unit 13 determines whether or not each lane marking information is effective, based on the lane marking information of each lane marking recognized by the traveling lane recognition unit 12. FIG. 10 is a figure showing one example of the lane marking information effective determination processing. There are three lanes on one side, and the right side lane branches on the way. In the period from the time t0 to the time t2, the own vehicle changes lanes from the center lane to the right side lane. At the time t1, the own vehicle crosses the lane marking which divides the center lane and the right side lane, by lane change.

In the present embodiment, the lane marking information effectiveness determination unit 13 determines effectiveness of the lane marking information of each lane marking, based on the information regarding the accuracy of the lane marking information of each lane marking transmitted from the lane marking information acquisition unit 11. For example, about the lane marking information of each lane marking, when the length VR (in this example, distance VR in front of the own vehicle) of the original lane markings (white line and the like) detected by the periphery monitoring apparatus 31, such as the camera or the laser radar, is longer than a determination length VRth, the lane marking information effectiveness determination unit 13 determines that the lane marking information is effective. And, when the length VR is shorter than the determination length VRth, the lane marking information effectiveness determination unit 13 determines that the lane marking information is not effective.

According to this configuration, it is determined that the lane marking information that the length VR of the original lane marking is long and the reliability of the lane marking information in front of the own vehicle is high is effective, and it can be used for generation of a lane change traveling route.

For example, in the example of FIG. 10, at the time t0 of starting the lane change, since the lengths VRL1, VRR1, VRR2 of the original lane markings of the left first lane marking L1, the right first lane marking R1, and the right second lane marking R2 are longer than the determination distance VRth, it is determined that the lane marking information of these lane markings L1, R1, R2 are effective. On the other hand, since the length VRL2 of the original lane marking of the left second lane marking L2 is shorter than the determination distance VRth, it is determined that the lane marking information of this lane marking L2 is not effective.

During lane change, after the time t0, the lane marking information effectiveness determination unit 13 determines the effectiveness of the lane marking information of each lane marking, whenever the lane marking information of each lane marking is obtained. As an elapsed time or a travel distance after lane change increases, the determination distance VRth may be shortened gradually. About the lane marking whose lane marking information cannot be acquired, it is determined that the lane marking information is not effective.

About the lane marking information of each lane marking, the lane marking information effectiveness determination unit 13 may determine the effectiveness of the lane marking information, based on the approximate accuracy of the approximated curve; or may determine the effectiveness of the lane marking information, based on the detection probability of the original lane marking.

In the present embodiment, the lane marking information effectiveness determination unit 13 determines whether or not each lane marking is a lane marking of a branch road, based on the curvature value K2 of the lane marking information of each lane marking; and determines the effectiveness of the lane marking information of each lane marking. When it is not scheduled to travel the branch road by lane change, the lane marking information effectiveness determination unit 13 determines that the lane marking information of the lane marking of the branch road is not effective. When it is scheduled to travel the branch road by lane change, the lane marking information effectiveness determination unit 13 determines that the lane marking information of the lane marking of the branch road is effective. In the example of FIG. 10, at the time t01, since the curvature value K2R2 of the right second lane marking R2 is different from the curvature values of other lane markings K2R1, K2L1, K2L2 by the determination curvature value or more, and it curves to right side, it is determined that it is the lane marking of the branch road branched to the right side. And, since there is no plan to travel the branch road of the right side, it is determined that the lane marking information of the right second lane marking R2 is not effective. The road shape obtained from map data may be used for determination of whether it is the branch road.

At the time t1, when the own vehicle crossed the lane marking, the traveling lane recognition unit 12 changes the correspondence relation between each lane marking and the own lane so that the own lane is changed to the right side lane after crossing from the center lane before crossing. As explained using FIG. 9, the left side lane marking of the center lane is changed to the left second lane marking L2 from the left first lane marking L1; the right side lane marking of the center lane is changed to the left first lane marking L1 from the right first lane marking R1; and the right side lane marking of the right side lane is changed to the right first lane marking R1 from the right second lane marking R2. Then, the lane marking information effectiveness determination unit 13 determines effectiveness about the lane marking information of each lane marking whose correspondence relation with the own lane was changed, by a method similar to before changing. At the time t1, the right first lane marking R1 is determined to be the lane marking of the branch road, and is determined continuously to be not effective.

As shown in FIG. 11, the determination result of effectiveness of each lane marking is correlated with each lane marking correlated with the own lane, and is stored in the storage apparatus, such as RAM. Since each lane marking correlated with the own lane is changed before and after the time t1 of crossing the lane marking, the determination result of effectiveness is shifted to left side. As shown in FIG. 11, the determination result of effectiveness at each time point during lane change may be stored in the storage apparatus 91, or only the determination result of the newest effectiveness may be stored in the storage apparatus 91.

4. Reference Lane Marking Selection Unit 14

In the step S04 of FIG. 4, the reference lane marking selection unit 14 executes a reference lane marking selection process (a reference lane marking selection step) that selects one lane marking from the lane marking on the left side (left first lane marking L1) and the lane marking on the right side (right first lane marking R1) of the own lane, as a reference lane marking during lane change, based on the effectiveness determination result of the lane marking information of each lane marking by the lane marking information effectiveness determination unit 13. During lane change, the reference lane marking selection unit 14 continuously selects one lane marking from the lane marking on the left side and the lane marking on the right side of the own lane, as the reference lane marking, whenever the determination result of the effectiveness of each lane marking is obtained. When the own vehicle crossed the lane marking, and the correspondence relation between each lane marking and the own lane changed, one lane marking is selected from the lane marking on the left side and the lane marking on the right side of the own lane after change, as the reference lane marking.

When it is determined that both of the left first lane marking L1 and the right first lane marking R1 are effective, the reference lane marking selection unit 14 selects one of the lane markings, as the reference lane marking. In this case, the reference lane marking selection unit 14 may select one of the left first lane marking L1 and the right first lane marking R1 which has higher degree of effectiveness, as the reference lane marking. For example, the longer one of the length VRL1 of the original lane marking of the left first lane marking L1 and the length VRL1 of the original lane marking of the right first lane marking R1 may be selected as the reference lane marking.

When it is determined that one of the left first lane marking L1 and the right first lane marking R1 is effective, the reference lane marking selection unit 14 selects one lane marking determined as effective, as the reference lane marking. When it is determined that both of the left first lane marking L1 and the right first lane marking R1 are not effective, the reference lane marking selection unit 14 does not select the reference lane marking. When the reference lane marking is not selected, the lane change traveling route is not generated. For example, at the start of lane change, the lane change is not started. During lane change, the lane change may be interrupted and the traveling route for traveling along the road may be generated, or the lane change may be continued based on the reference lane marking generated when the reference lane marking was selected before.

5. Traveling Route Generation Unit 15

In the step S05 of FIG. 4, the traveling route generation unit 15 executes a traveling route generation processing (a traveling route generation step) that generates the lane change traveling route which is a traveling route for changing lanes during lane change, based on the lane marking information of the reference lane marking. The traveling route generation unit 15 generates the lane change traveling route periodically during lane change, based on the lane marking information of the acquired newest reference lane marking.

According to this configuration, the lane change traveling route is generated, based on the newest lane marking information of each lane marking successively obtained during lane change, and the lane marking information of the reference lane marking selected from the lane markings on the left side and the right side of the own lane based on the effectiveness determination result. Accordingly, based on the lane marking information of the newest own lane obtained successively during lane change, the lane change traveling route can be generated with good accuracy.

Figure 12:
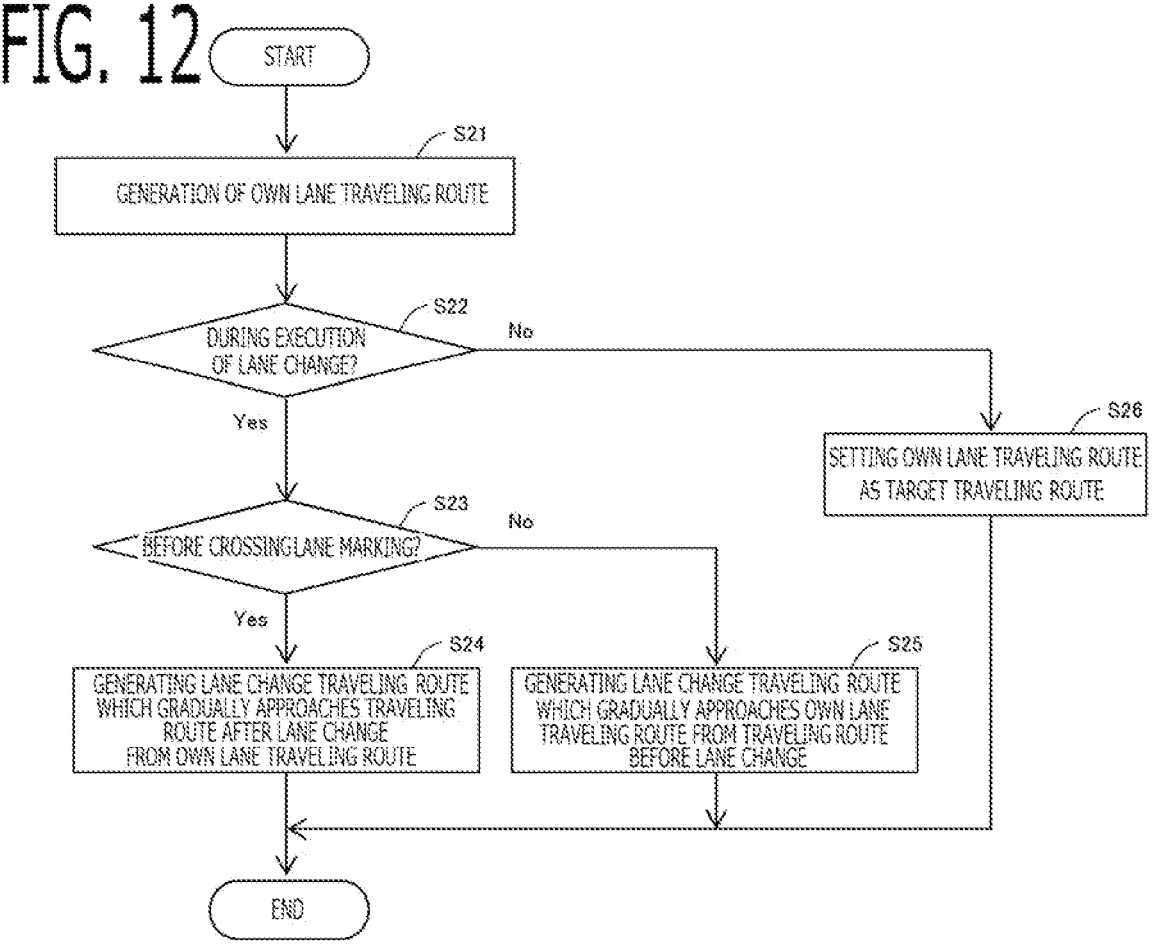
FIG. 12 is a flowchart for explaining the traveling route generation processing according to Embodiment 1.
Figure 13:
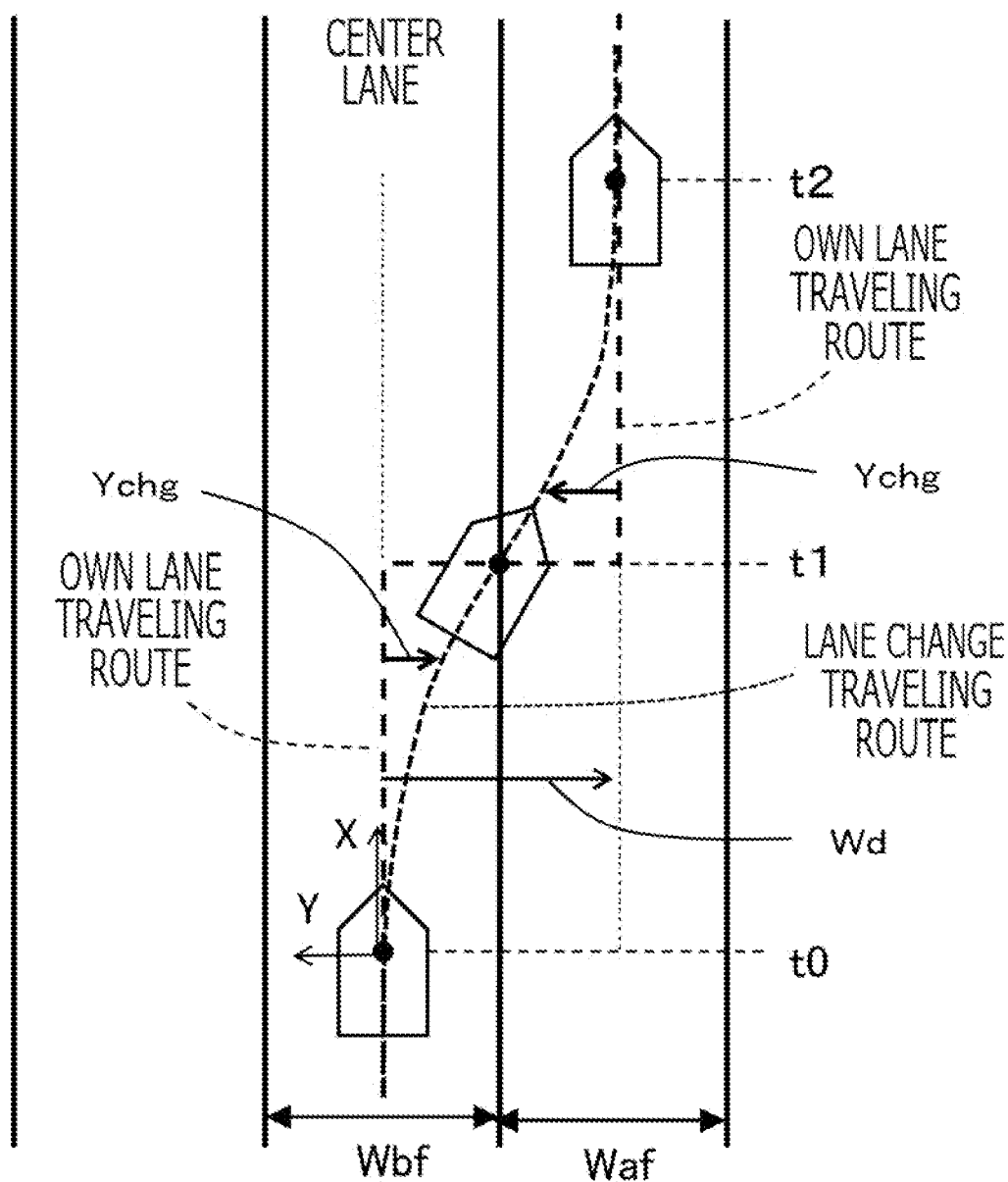
FIG. 13 is a figure for explaining generation of the lane change traveling route according to Embodiment 1.

The traveling route generation processing according to the present embodiment will be explained using the flowchart of FIG. 12. Processing of FIG. 12 is executed at every predetermined calculation period. FIG. 13 shows an example in the case of carrying out the lane change from the center lane to the right side lane. In the period from the time t0 to the time t2, the own vehicle changes lanes from the center lane to the right side lane. At the time t1, the own vehicle crosses the lane marking which divides the center lane and the right side lane, by lane change.

<Generation of Own Lane Traveling Route>

In the step S21, the traveling route generation unit 15 generates an own lane traveling route which is a traveling route when not changing lanes but traveling along the own lane, based on the lane marking information of the reference lane marking. Before crossing the lane marking, the own lane is determined to the lane before lane change, and the reference lane marking is set to the lane marking on the left side or the lane marking on the right side of the lane before lane change. The own lane traveling route becomes a traveling route when traveling along the lane before lane change. After crossing the lane marking, the own lane is determined to the lane after lane change, and the reference lane marking is set to the lane marking on the left side or the lane marking on the right side of the lane after lane change. The own lane traveling route becomes a traveling route when traveling along the lane after lane change.

In the present embodiment, as shown in FIG. 7, the traveling route generation unit 15 shifts the approximated curve of the reference lane marking expressed by the lane marking information of the reference lane marking, in the lateral direction of the own vehicle, by a shift width $\Delta Wsft$ according to the lane width Wown of the own lane, and generates the own lane traveling route. For example, as shown in the next equation, the traveling route generation unit 15 shifts the approximated curve of the reference lane marking in the own vehicle coordinate system shown in the equation (1), by the shift width $\Delta Wsft$ in the lateral direction, and sets the own lane traveling route Yown. The positive/negative of the shift width $\Delta Wsft$ is changed according to whether the reference lane marking is the right side lane marking or the left side lane marking of the own lane, so that the own lane traveling route Yown is set in the center of the own lane. Herein, K0$b$ is the lane marking distance of the reference lane marking; K1$b$ is the lane marking angle of the reference lane marking; K2$b$ is the curvature of the reference lane marking; and K3$b$ is the curvature change rate of the reference lane marking.

[Equation 2]

$$Yown = \left\{ K0b + K1b \times X + \frac{1}{2} \times K2b \times X^2 + \frac{1}{6} \times K3b \times X^3 \right\} + \Delta Wsft \quad (6)$$

1) When the reference lane marking is the right side lane marking of the own lane, $$\Delta Wsft = \frac{1}{2} \times Wown$$

2) When the reference lane marking is the left side lane marking of the own lane, $$\Delta Wsft = -\frac{1}{2} \times Wown$$

The traveling route generation unit 15 sets the lane width Wown of the own lane, based on the lane marking information on the left first lane marking L1 and the right first lane marking R1 of the own lane. For example, as shown in the next equation, the lane width Wown of the own lane is set to a difference between the lane marking distance K0L1 of the left first lane marking L1, and the lane marking distance K0R1 of the right first lane marking R1.

[Equation 3]

$$Wown = K0L1 - K0R1 \quad (7)$$

When the lane marking information of both of the left first lane marking L1 and the right first lane marking R1 are not obtained, the lane width Wown of the own lane may be set to a lane width of the corresponding lane acquired in the past; may be set to a lane width obtained from map data; and may be set to a standard lane width.

In the step S22, the traveling route generation unit 15 determines whether or not it is during execution of lane change. When determining that it is during execution of lane change, it advances to the step S23, and when determining that it is not during execution of lane change, it advances to the step S26. In the step S26, since it is not during execution of lane change, the traveling route generation unit 15 sets the own lane traveling route Yown as the final target traveling route.

<Crossing Determination of Lane Marking>

On the other hand, when it is during execution of lane change, in the step S23, after the start of lane change, the traveling route generation unit 15 determines whether or not the own vehicle crossed the lane marking which divides the lane before lane change and the lane after lane change, based on the determination result of the traveling lane recognition unit 12. When determining that it is before crossing the lane marking, it advances to the step S24, and when determining that it is after crossing the lane marking, it advances to the step S25.

<Generation of Lane Change Traveling Route Before Crossing Lane Marking>

In the step S24, before crossing the lane marking, the traveling route generation unit 15 generates the lane change traveling route which gradually approaches the traveling route of the lane after lane change from the own lane traveling route.

In the present embodiment, the traveling route generation unit 15 calculates a whole lateral direction traveling distance Wd which is a distance where the own vehicle moves in the lateral direction from start to end of lane change, based on the lane marking information of each lane marking. For example, as shown in the next equation, the traveling route generation unit 15 calculates a value obtained by multiplying +1 or −1 according to the lane change direction, to a half value of a total value of the lane width Wbf of the lane before lane change and the lane width Waf of the lane after lane change, as the whole lateral direction traveling distance Wd. Before crossing the lane marking, the lane before lane change is the own lane. The traveling route generation unit 15 calculates a difference between the lane marking distance K0 of the lane marking on the left side of the lane before lane change, and the lane marking distance K0 of the lane marking on the right side of the lane before lane change, as the lane width Wbf of the lane before lane change. The traveling route generation unit 15 calculates a difference between the lane marking distance K0 of the lane marking on the left side of the lane after lane change, and the lane marking distance K0 of the lane marking on the right side of the lane after lane change, as the lane width Waf of the lane after lane change.

[Equation 4]

1) When changing lanes to the left side lane, (8)

$$Wd = \frac{1}{2} \times (Wbf + Waf)$$

2) When changing lanes to the right side, $$Wd = -\frac{1}{2} \times (Wbf + Waf)$$

When the lane marking information of one or both of the right side lane marking and the left side lane marking of the lane before lane change is not obtained, the lane width Wbf of the lane before lane change may be set to a lane width of the corresponding lane acquired in the past; may be set to a lane width obtained from map data; or may be set to a standard lane width. When the lane marking information of one or both of the right side lane marking and the left side lane marking of the lane after lane change is not obtained, the lane width Waf of the lane after lane change may be set to a lane width of the corresponding lane acquired in the past; may be set to a lane width of the corresponding lane obtained from map data; or may be set to a standard lane width.

Before crossing lane marking, the traveling route generation unit 15 gradually changes a traveling distance Ychg of the own vehicle in the lateral direction with respect to the own lane traveling route Yown, from 0 to the whole lateral direction traveling distance Wd, according to a traveling distance Xchg of the own vehicle in the front direction from the start time point of lane change (hereinafter, referred to as a front direction traveling distance Xchg after lane change start); and adds the traveling distance Ychg in the lateral direction to the own lane traveling route Yown, and generates the lane change traveling route YLC.

In the present embodiment, using the next equation, the traveling route generation unit 15 calculates the traveling distance Ychg in the lateral direction, based on the front direction traveling distance Xchg after lane change start and the whole lateral direction traveling distance Wd.

[Equation 5]

$$Ychg = Wd \times \left\{ a + b \times \left(\frac{Xchg}{L}\right) + c \times \left(\frac{Xchg}{L}\right)^2 + d \times \left(\frac{Xchg}{L}\right)^3 + e \times \left(\frac{Xchg}{L}\right)^4 + f \times \left(\frac{Xchg}{L}\right)^5 \right\} \quad (9)$$

$$Xchg = X + Xrun$$

Herein, L is a target traveling distance in the front direction from the start time point of lane change to the end time point; and is changed according to the vehicle speed of the own vehicle detected by the vehicle speed detection apparatus 32. Xrun is a traveling distance of the own vehicle in the front direction from the start time point of lane change to the current position of the own vehicle; and is calculated by integrating the traveling distance of the own vehicle from the start time point of lane change. X is a position in the front direction of the own vehicle coordinate system on the basis of the current position of the own vehicle. The traveling route generation unit 15 increases the position X in the front direction gradually from 0 to the lane change end position Xend (=L−Xrun); and calculates the traveling distance Ychg in the lateral direction using the equation (9) at the each position X in the front direction. As a result, the each position X in the front direction, and the traveling distance Ychg in the lateral direction at the each position X in the front direction are calculated.

The polynomial in { } of the equation (9) is a polynomial in which (Xchg/L) is a variable; and changes gradually from 0 to 1, as (Xchg/L) increases from 0 to 1. a, b, c, d, e are coefficients of respective orders of the polynomial; and are preliminarily set so as to imitate the lane change of the skilled driver. For example, it is set as a=b=c=0, d=10, e=−15, and f=6.

Instead of the polynomial of the equation (9), a map data in which a relationship between Xchg/L and a coefficient which changes from 0 to 1 is preliminarily set may be used.

Then, as shown in the next equation, the traveling route generation unit 15 calculates the lane change traveling route YLC by adding the traveling distance Ychg in the lateral direction to the own lane traveling route Yown.

$$YLC = Yown + Ychg \quad (10)$$

The traveling route generation unit 15 gradually increases the position X in the front direction from 0 to the lane change end position Xend (=L−Xrun); and adds the own lane traveling route Yown calculated using the equation (6) and the traveling distance Ychg in the lateral direction calculated using the equation (9), at the each position X in the front direction, and calculates the lane change traveling route YLC. As the result, in the own vehicle coordinate system on the basis of the current position of the own vehicle, the each position X in the front direction, and the lane change traveling route YLC (the position in the lateral direction) at the each position X in the front direction are calculated. Then, the traveling route generation unit 15 sets the lane change traveling route YLC as the final target traveling route.

<Generation of Lane Change Traveling Route After Crossing Lane Marking>

In the step S25, after crossing the lane marking, the traveling route generation unit 15 generates the lane change traveling route which gradually approaches the own lane traveling route from the traveling route of the lane before lane change.

In the present embodiment, similarly to before crossing the lane marking, the traveling route generation unit 15 calculates the whole lateral direction traveling distance Wd which is a distance where the own vehicle moves in the lateral direction from start to end of lane change, based on the lane marking information of each lane marking. For example, the traveling route generation unit 15 calculates the whole lateral direction traveling distance Wd using the equation (8). After crossing the lane marking, the lane after lane change is the own lane.

After crossing the lane marking, the traveling route generation unit 15 gradually changes the traveling distance Ychg of the own vehicle in the lateral direction with respect to the own lane traveling route Yown, from a value obtained by multiplying −1 to the whole lateral direction traveling distance Wd to 0, according to the front direction traveling distance Xchg after lane change start; and adds the traveling distance Ychg in the lateral direction to the own lane traveling route Yown, and generates the lane change traveling route YLC.

In the present embodiment, using the next equation, the traveling route generation unit 15 calculates the traveling distance Ychg in the lateral direction, based on the front direction traveling distance Xchg after lane change start and the whole lateral direction traveling distance Wd.

[Equation 6]

$$Ychg = -Wd \times \left[1 - \left\{a + b \times \left(\frac{Xchg}{L}\right) + c \times \left(\frac{Xchg}{L}\right)^2 + d \times \left(\frac{Xchg}{L}\right)^3 + e \times \left(\frac{Xchg}{L}\right)^4 + f \times \left(\frac{Xchg}{L}\right)^5\right\}\right] \quad (11)$$

$$Xchg = X + Xrun$$

The traveling route generation unit 15 increases the position X in the front direction gradually from 0 to the lane change end position Xend (=L−Xrun); and calculates the traveling distance Ychg in the lateral direction using the equation (11) at the each position X in the front direction. As a result, the each position X in the front direction, and the traveling distance Ychg in the lateral direction at the each position X in the front direction are calculated.

Then, as shown in the next equation, the traveling route generation unit 15 calculates the lane change traveling route YLC by adding the traveling distance Ychg in the lateral direction to the own lane traveling route Yown.

$$YLC = Yown + Ychg \quad (12)$$

The traveling route generation unit 15 increases the position X in the front direction gradually from 0 to the lane change end position Xend (=L−Xrun); and adds the own lane traveling route Yown calculated using the equation (6) and the traveling distance Ychg in the lateral direction calculated using the equation (11), at the each position X in the front direction, and calculates the lane change traveling route YLC. As the result, in the own vehicle coordinate system on the basis of the current position of the own vehicle, the each position X in the front direction, and the lane change traveling route YLC (the position in the lateral direction) at the each position X in the front direction are calculated. Then, the traveling route generation unit 15 sets the lane change traveling route YLC as the final target traveling route.

In the example shown in FIG. 13, before crossing the lane marking (before the time t1), the center lane is determined as the own lane; the own lane traveling route Yown generated based on the reference lane marking of the own lane which was determined as effective is set to the center of the center lane; and the lane change traveling route YLC is calculated by adding the lateral direction traveling distance Ychg which gradually changes from 0 to the whole lateral direction traveling distance Wd, to the own lane traveling route Yown.

On the other hand, after crossing the lane marking (after the time t1), the right side lane is determined as the own lane; the own lane traveling route Yown generated based on the reference lane marking of the own lane which was determined as effective is set to the center of the right side lane; and the lane change traveling route YLC is calculated by adding the lateral direction traveling distance Ychg which gradually changes from a value obtained by multiplying −1 to the whole lateral direction traveling distance Wd to 0, to the own lane traveling route Yown.

In this way, before and after crossing the lane marking, based on the lane marking information of the newest own lane which was determined as effective, the lane change traveling route can be generated with good accuracy.

6. Steering Control Unit 16

The steering control unit 16 executes a steering control processing (a steering control step) that performs a steering control which controls a steering angle of wheels, based on the target traveling route (the lane change traveling route YLC during lane change, the own lane traveling route Yown except during lane change) generated by the traveling route generation unit 15.

<Steering Control>

The steering control unit 16 calculates a command value of the steering angle of wheels which makes the own vehicle travel along with the target traveling route, based on the target traveling route, the vehicle speed, and the like; and transmits to the steering apparatus 24. The lane change control may be provided as a part of automatic driving function of the automatic driving vehicle.

The steering apparatus 24 is an electric power steering apparatus, and manipulates the steering angle of wheels by a driving force of an electric motor. The steering apparatus 24 performs driving control of the electric motor so that an actual steering angle follows the command value of the steering angle.

Embodiment 2

Next, the traveling route generation apparatus 10 and the traveling route generation method according to Embodiment 2 will be explained. The explanation for constituent parts the same as those in Embodiment 1 will be omitted. The basic configuration and processing of the traveling route generation apparatus 10 according to the present embodiment are the same as those of Embodiment 1. In the present embodiment, a part of processing of the traveling route generation unit 15 is different from Embodiment 1.

In the present embodiment, when the lane marking information of one of the lane marking on the left side and the lane marking on the right side of the own lane cannot be acquired after crossing the lane marking, the traveling route generation unit 15 generates the own lane traveling route so as to be closer to the lane marking on the left side or the lane marking on the right side whose lane marking information can be acquired, as compared with when generating based on the lane marking information of the lane marking on the left side and the lane marking on the right side of the lane after lane change which were acquired in the past.

On the side of the lane marking whose lane marking information cannot be acquired, the lane marking cannot be detected merely, and there is a possibility that the lane width where the vehicle can actually travel becomes narrow. According to this configuration, after crossing the lane marking, since the own lane traveling route is generated so as to be closer to the side of the lane marking whose lane marking information side can be acquired, even when the lane width becomes narrow, the own vehicle can travel the narrow lane.

Similarly to Embodiment 1, the traveling route generation unit 15 shifts the approximated curve of the reference lane marking expressed by the lane marking information of the reference lane marking, in the lateral direction of the own vehicle, by a shift width $\Delta Wsft$ according to the lane width Wown of the own lane, and generates the own lane traveling route. For example, as shown in the equation (6), the traveling route generation unit 15 shifts the approximated curve of the reference lane marking in the own vehicle coordinate system shown in the equation (1), by the shift width $\Delta Wsft$ in the lateral direction, and sets the own lane traveling route Yown.

In the present embodiment, when the lane marking information of one of the lane marking on the left side and the lane marking on the right side of the own lane cannot be acquired after crossing the lane marking, the traveling route generation unit 15 makes the shift width $\Delta Wsft$ smaller than when generating based on the lane marking of the lane marking on the left side and the lane marking on the right side of the lane after lane change which were acquired in the past.

For example, as shown in the next equation, when one of the lane marking information cannot be acquired, the traveling route generation unit 15 calculates, as the shift width $\Delta Wsft$, a value obtained by multiplying +1 or −1 according to whether the lane marking whose lane marking information cannot be acquired is the right side or the left side, to a value obtained by subtracting a closing width Wcmp from a half value of a lane width Waf_old of the lane after lane change calculated based on the lane marking information on the left side and the right side of the lane after lane change which were acquired in the past. The traveling route generation unit 15 may lower-limit an absolute value of the shift width $\Delta Wsft$ by a width according to a vehicle width of the own vehicle so that the shift width $\Delta Wsft$ does not become narrow too much.

[Equation 7]

1) When the lane marking information of (13)
the lane marking on the left side of the own lane
cannot be acquired after crossing the lane marking, $$\Delta Wsft = \frac{1}{2} \times \text{Waf\_olk} - Wcmp$$

2) When the lane marking information of the lane marking on the right side of the own lane cannot be acquired after crossing the lane marking, $$\Delta Wsft = -\left(\frac{1}{2} \times \text{Waf\_old} - Wcmp\right)$$

Alternatively, the traveling route generation unit 15 may set a value obtained by subtracting the closing width Wcmp from the standard lane width, as the shift width $\Delta Wsft$. The standard lane width may be set according to classification of the traveling road; may be acquired from map data; or may be set to a lane width of other lane calculated based on the lane marking information.

And, in the present embodiment, when the lane marking information of one of the lane marking on the left side and the lane marking on the right side of the own lane cannot be acquired after crossing the lane marking, the traveling route generation unit 15 changes the whole lateral direction traveling distance Wd by the closing width Wcmp of the own lane traveling route, as compared with when generating based on the lane marking information of the lane marking on the left side and the lane marking on the right side of the lane after lane change which were acquired in the past.

According to this configuration, the whole lateral direction traveling distance Wd is changed corresponding to the closing width Wcmp of the own lane traveling route, and the lane change traveling route can be generated appropriately.

For example, as shown in the next equation, the traveling route generation unit 15 calculates, as the whole lateral direction traveling distance Wd, a value obtained by multiplying +1 or −1 according to the lane change direction, to a value obtained by changing a half value of a total value of the lane width Wbf of the lane before lane change, and the lane width Waf_old of the lane after lane change acquired in the past, by the closing width Wcmp.

[Equation 8]

1) When changing lanes to the left side lane, and (14)

(a) when the lane marking information of the lane marking on the left side of the own lane cannot be acquired after crossing the lane marking, $$Wd = \frac{1}{2} \times (Wbf + \text{Waf\_old}) - Wcmp$$

(b) when the lane marking information of the lane marking on the right side of the own lane cannot be acquired after crossing the lane marking, $$Wd = \frac{1}{2} \times (Wbf + \text{Waf\_old}) + Wcmp$$

-continued

2) When changing lanes to the ride side lane, and (a) when the lane marking information of the lane marking on the right side of the own lane cannot be acquired after crossing the lane marking, $$Wd = -\frac{1}{2} \times (Wbf + \text{Waf\_old}) + Wcmp$$

(b) when the lane marking information of the lane marking on the left side of the own lane cannot be acquired after crossing the lane marking, $$Wd = -\frac{1}{2} \times (Wbf + \text{Waf\_old}) - Wcmp$$

Then, similar to Embodiment 1, using the equation (11), the traveling route generation unit 15 calculates the traveling distance Ychg in the lateral direction, based on the front direction traveling distance Xchg after lane change start and the whole lateral direction traveling distance Wd. Then, using the equation (12), the traveling route generation unit 15 calculates the lane change traveling route YLC by adding the traveling distance Ychg in the lateral direction to the own lane traveling route Yown.

Figure 14:
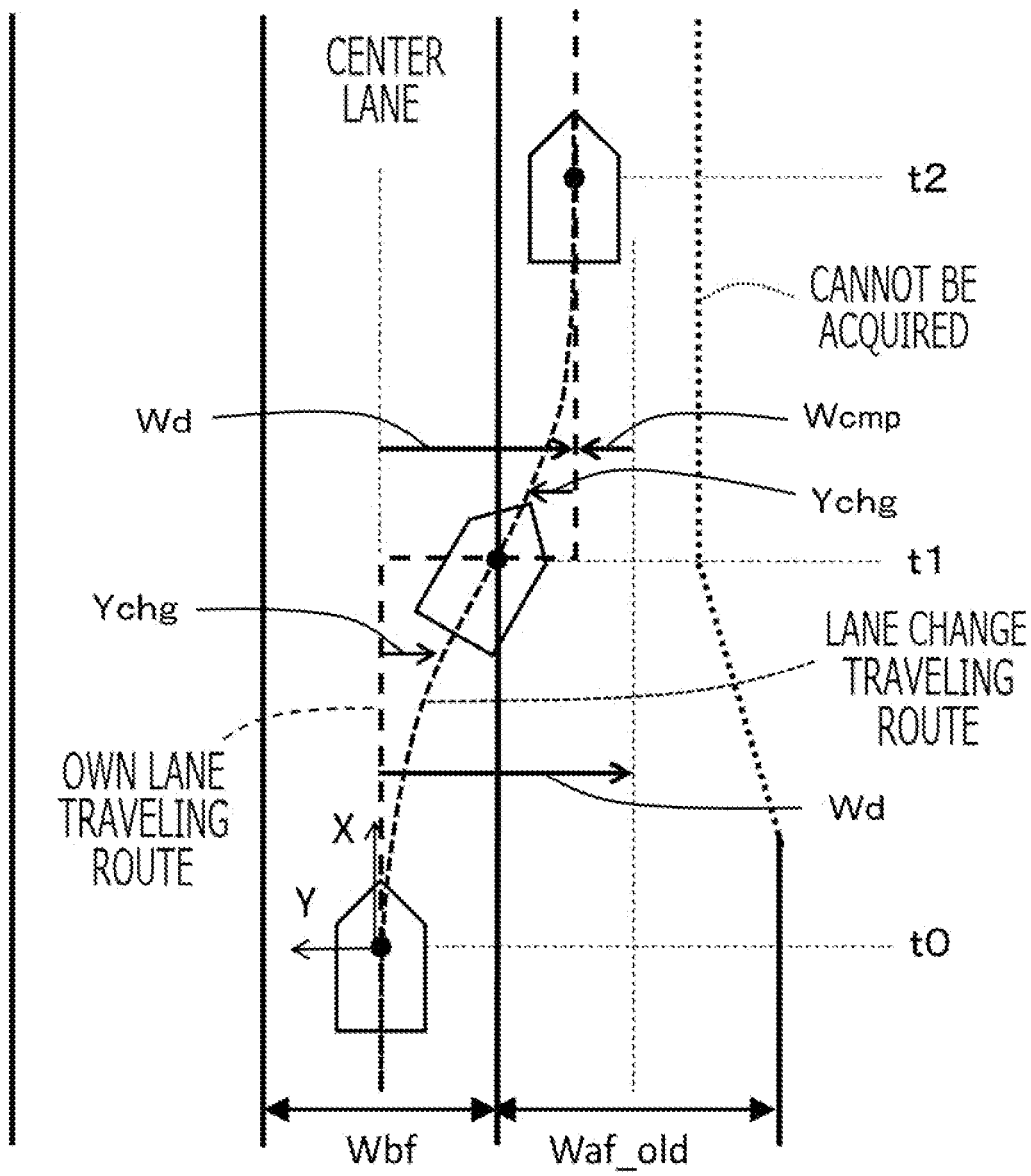
FIG. 14 is a figure for explaining generation of the lane change traveling route according to Embodiment 2.

FIG. 14 shows an example of the traveling route generation processing according to the present embodiment. There are three lanes on one side, and the lane marking on the right side of the right side lane is lost on the way, and cannot be acquired. In the period from the time t0 to the time t2, the own vehicle changes lanes from the center lane to the right side lane. At the time t1, the own vehicle crosses the lane marking which divides the center lane and the right side lane, by lane change.

Before the lane marking on the right side of the right side lane is lost, the lane marking information of this lane marking can be acquired, and the lane width Waf of the lane after lane change is acquired based on the lane marking information of the lane marking on the left side and the lane marking on the right side of the right side lane. The lane width Waf of the lane after lane change acquired lastly is stored.

At the time t1, after crossing the lane marking, the left side lane marking of the own lane which was set to the right side lane is selected as the reference lane marking, and the own lane traveling route is generated based on the lane marking information of the reference lane marking. At this time, since the lane marking information of the right side lane marking of the own lane is not acquired, a value obtained by subtracting the closing width Wcmp from the lane width Waf_old of the lane after lane change acquired in the past is set as the shift width ΔWsft. As the result, the own lane traveling route is generated so as to be closer to the left side by the closing width Wcmp, as compared with when generating based on the lane width Waf_old of the lane after lane change acquired in the past. Accordingly, as shown by a dotted line, even when the lane end on the right side of the right side lane become closer to the left side, and the lane width is decreasing, the own vehicle can travel within the lane which becomes narrow.

Since the whole lateral direction traveling distance Wd is changed corresponding to the closing width Wcmp, and the lane change traveling route is generated, the lane change traveling route is appropriately generated even after correction by the closing width Wcmp, and the lane change traveling route can be prevented from becoming discontinuous, before and after correction by the closing width Wcmp.

Embodiment 3

Next, the traveling route generation apparatus 10 and the traveling route generation method according to Embodiment 3 will be explained. The explanation for constituent parts the same as those in Embodiment 1 will be omitted. The basic configuration and processing of the traveling route generation apparatus 10 according to the present embodiment are the same as those of Embodiment 1. In the present embodiment, a part of processing of the traveling route generation unit 15 is different from Embodiment 1.

Figure 15:
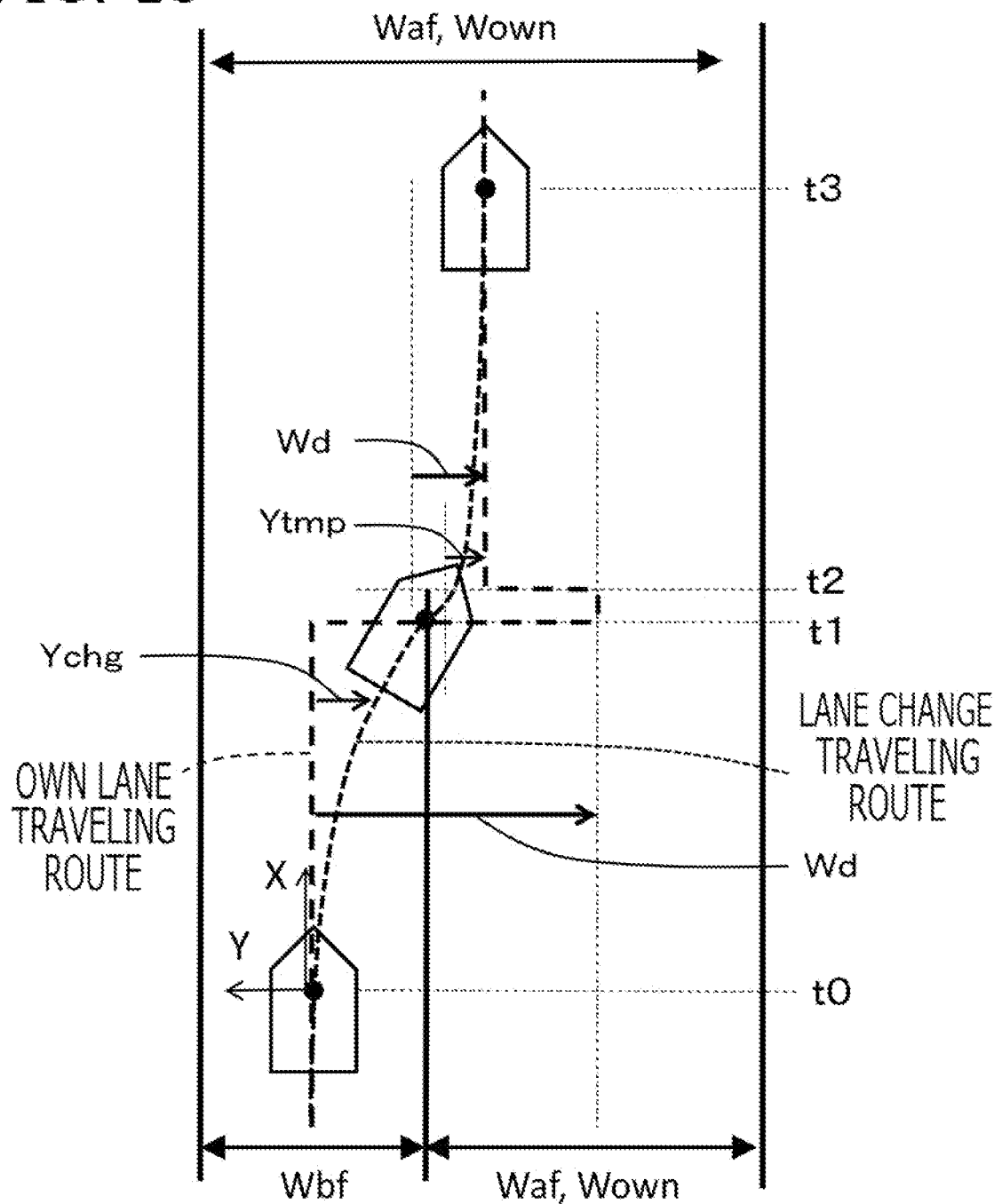
FIG. 15 is a figure for explaining generation of the lane change traveling route according to Embodiment 3.

As shown in FIG. 15, in a case where the lane change is performed in a section where a lane number decreases, after crossing the lane marking, the crossed lane marking is lost, the lane number decreases, and the lane width of the own lane may increase largely. In this case, according to the method of Embodiment 1, since the own lane traveling route is generated at the central part of the own lane whose lane width increased, a large problem does not occur in generation of the own lane traveling route. However, according to the method of Embodiment 1, since the lane width Waf of the lane after lane change increases largely and the lane width Wbf of the lane before lane change cannot be acquired, it is set to the lane width Wbf_old of the lane before lane change acquired in the past. Accordingly, the absolute value of the whole lateral direction traveling distance Wd calculated by the equation (8) increases largely, and the generated lane change traveling route becomes inappropriate.

Then, in the present embodiment, after crossing the lane marking, after a variation amount of lane width ΔWown between the lane width Wown (n−1) of the own lane acquired last time and the lane width Wown (n) of the own lane acquired this time becomes greater than or equal to a preliminarily set determination variation amount Thw, the traveling route generation unit 15 changes the whole lateral direction traveling distance Wd, according to the distance Ytmp in the lateral direction of the own lane traveling route with respect to the own vehicle when becoming greater than or equal to the determination variation amount Thw.

In the present embodiment, as shown in the next equation, after crossing the lane marking, when the variation amount of lane width ΔWown between the lane width Wown (n−1) of the own lane acquired last time and the lane width Wown(n) of the own lane acquired this time becomes greater than or equal to the preliminarily set determination variation amount Thw, the traveling route generation unit 15 calculates a double value of the distance Ytmp in the lateral direction of the own lane traveling route with respect to the own vehicle, as the whole lateral direction traveling distance Wd.

[Equation 9]

$\Delta Wown = Wown(n) - Wown(n-1)$  1) When
$\Delta Wown >= Thw$ after crossing the lane making,
$Wd = 2 \times Ytmp$ \hfill (15)

Then, similar to Embodiment 1, using the equation (11), the traveling route generation unit 15 calculates the traveling distance Ychg in the lateral direction, based on the front direction traveling distance Xchg after lane change start, and the whole lateral direction traveling distance Wd calculated by the equation (15). Similarly to Embodiment 1, as shown in the equation (12), the traveling route generation unit 15 calculates the lane change traveling route YLC by adding the traveling distance Ychg in the lateral direction to the own lane traveling route Yown.

As shown in FIG. 15, after crossing the lane marking at the time t1, the crossed lane marking is lost at the time t2, the lane width Wown of the own lane increases largely, and the variation amount of lane width ΔWown becomes greater than or equal to the preliminarily set determination variation amount Thw. At this time, the own lane traveling route Yown is changed to the center of one lane after the lane marking is lost, from the center of the right side lane before the lane marking is lost.

Unlike the present embodiment, in the case where the whole lateral direction traveling distance Wd is not corrected by the distance Ytmp in the lateral direction of the own lane traveling route with respect to the own vehicle, the whole lateral direction traveling distance Wd becomes large too much, and an inappropriate lane change traveling route which becomes discontinuous before and after the lane marking is lost is generated. On the other hand, in the case where the whole lateral direction traveling distance Wd is corrected by the distance Ytmp in the lateral direction of the own lane traveling route with respect to the own vehicle, the whole lateral direction traveling distance Wd can be decreased appropriately, the lane change traveling route can be prevented from becoming discontinuous before and after the lane marking is lost, and an appropriate lane change traveling route can be generated.

Figure 16:
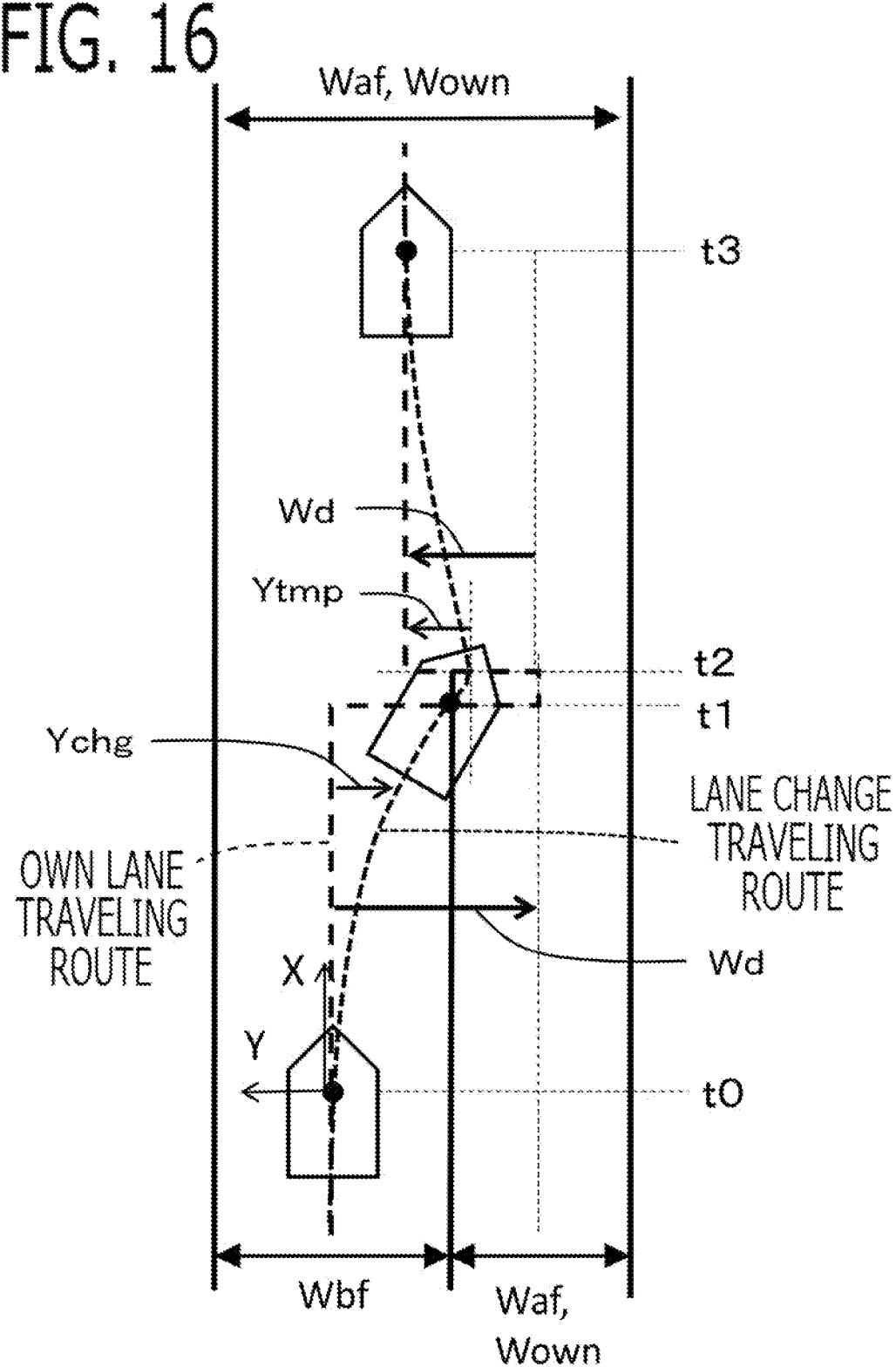
FIG. 16 is a figure for explaining generation of the lane change traveling route according to Embodiment 3.

On the other hand, as shown in FIG. 16, after crossing the lane marking at the time t1, even when the crossed lane marking is lost at the time t2, and the own lane traveling route is changed in a direction opposite to the lane change direction with respect to the own vehicle, a sign of the distance Ytmp in the lateral direction of the own lane traveling route with respect to the own vehicle and a sign of the whole lateral direction traveling distance Wd are reversed, and the lane change traveling route is generated appropriately.

Other Embodiments

The traveling route generation apparatus explained above can be applied also to a traveling route generative system which is constructed as a system by combining suitably a navigation apparatus, such as PND (Portable Navigation Device), a communication terminal apparatus including a portable terminal device, such as a mobile phone, a smart phone, and a tablet, an application function installed in these, and a server. In this case, each function or each component of the traveling route generation apparatus explained above may be distributedly arranged to each apparatus which constructs the system, or may be collectively arranged to any one of apparatuses.

Although the present disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments. It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

REFERENCE SIGNS LIST

10: Traveling Route Generation Apparatus, 11: Lane marking Information Acquisition Unit, 12: Traveling Lane Recognition Unit, 13: Lane marking Information Effectiveness Determination Unit, 14: Reference Lane marking Selection Unit, 15: Traveling Route Generation Unit, 16: Steering Control Unit, Wd: Whole lateral direction traveling distance, Xchg: Traveling distance in the front direction, YLC: Lane change traveling route, Ychg: Traveling distance in the lateral direction, Yown: Own lane traveling route

What is claimed is:

1. A traveling route generation apparatus comprising at least one processor configured to implement:
a lane marking information acquisitor that acquires lane marking information regarding position and shape of each lane marking on a basis of a position of an own vehicle, about lane markings of one or a plurality of lanes which can be recognized in front of the own vehicle and includes an own lane which is a lane where the own vehicle is traveling and a lane adjacent to the own lane;
a traveling lane recognizer that determines a correspondence relation between each lane marking and the own lane, based on the lane marking information of each lane marking;
a lane marking information effectiveness determiner that, during lane change of the own vehicle, determines whether or not the lane marking information of each lane marking is effective lane marking information which can be used for generation of a lane change traveling route which is a traveling route for changing lanes;
a reference lane marking selector that, during lane change, selects one lane marking from a lane marking on a left side and a lane marking on a right side of the own lane, as a reference lane marking, based on an effectiveness determination result of the lane marking information of each lane marking by the lane marking information effectiveness determiner; and
a traveling route generator that, during lane change, generates the lane change traveling route which is a traveling route for changing lanes, based on the lane marking information of the reference lane marking.

2. The traveling route generation apparatus according to claim 1,
wherein, when the own vehicle crosses a lane marking, the traveling lane recognizer changes the correspondence relation between each lane marking and the own lane so that the own lane is changed to a lane after crossing from a lane before crossing,
wherein the traveling route generator generates an own lane traveling route which is a traveling route when not changing lanes but traveling along the own lane, based on the lane marking information of the reference lane marking;
before crossing lane marking, generates the lane change traveling route which gradually approaches a traveling route of a lane after lane change from the own lane traveling route; and
after crossing lane marking, generates the lane change traveling route which gradually approaches the own lane traveling route from a traveling route of a lane before lane change.

3. The traveling route generation apparatus according to claim 2,
wherein the traveling route generator calculates a whole lateral direction traveling distance which is a distance where the own vehicle moves in a lateral direction from start to end of lane change, based on the lane marking information of each lane marking;

before crossing lane marking, changes gradually a traveling distance in the lateral direction of the own vehicle with respect to the own lane traveling route, from 0 to the whole lateral direction traveling distance, according to a traveling distance in a front direction of the own vehicle from a start time point of lane change, and generates the lane change traveling route by adding the traveling distance in the lateral direction to the own lane traveling route;

after crossing lane marking, gradually changes the traveling distance in the lateral direction, from a value obtained by multiplying −1 to the whole lateral direction traveling distance to 0, according to the traveling distance in the front direction, and generates the lane change traveling route by adding the traveling distance in the lateral direction to the own lane traveling route.

4. The traveling route generation apparatus according to claim 3,
wherein the lane marking information acquisitor acquires information including a lane marking distance which is a distance between a part of the lane marking located in a lateral direction of the own vehicle and the own vehicle, as the lane marking information of the each lane marking; and
wherein the traveling route generator calculates the whole lateral direction traveling distance, based on the lane marking distance of each lane marking.

5. The traveling route generation apparatus according to claim 2,
wherein, when the lane marking information of one of the lane marking on the left side and the lane marking on the right side of the own lane cannot be acquired after crossing lane marking, the traveling route generator generates the own lane traveling route so as to be closer to the lane marking on the left side or the lane marking on the right side whose lane marking information can be acquired, as compared with when generating based on the lane marking information of the lane marking on the left side and the lane marking on the right side of a lane after the lane change which were acquired in the past.

6. The traveling route generation apparatus according to claim 4,
wherein, after crossing lane marking, after a variation amount of lane width between a lane width of the own lane acquired last time and a lane width of the own lane acquired this time becomes greater than or equal to a preliminarily set determination variation amount, the traveling route generator changes the whole lateral direction traveling distance, according to a distance in the lateral direction of the own lane traveling route with respect to the own vehicle when becoming greater than or equal to the determination variation amount.

7. The traveling route generation apparatus according to claim 1,
wherein the lane marking information acquisitor detects the lane marking by a periphery monitoring apparatus, and acquires the lane marking information, based on the detected lane marking;
wherein, about the lane marking information of each lane marking,
when a length in front of the own vehicle of the lane marking detected by the periphery monitoring apparatus is longer than a determination length, the lane marking information effectiveness determiner determines that the lane marking information is effective; and
when the length is shorter than the determination length, the lane marking information effectiveness determiner determines that the lane marking information is not effective.

8. The traveling route generation apparatus according to claim 1,
wherein the lane marking information acquisitor acquires information including a curvature of lane marking, as the lane marking information of each lane marking; and
wherein the lane marking information effectiveness determiner determines that the lane marking information of the lane marking whose curvature is different from the curvatures of other lane markings more than a determination curvature value is not effective.

9. The traveling route generation apparatus according to claim 1, further comprising a steering controller that performs a steering control which controls a steering angle of wheels, based on the lane change traveling route.

10. A traveling route generation method comprising:
acquiring lane marking information regarding position and shape of each lane marking on a basis of a position of an own vehicle, about lane markings of one or a plurality of lanes which can be recognized in front of the own vehicle and include an own lane which is a lane where the own vehicle is traveling, and a lane adjacent to the own lane;
determining a correspondence relation between each lane marking and the own lane, based on the lane marking information of each lane marking;
during lane change of the own vehicle, determining whether or not the lane marking information of each lane marking is effective lane marking information which can be used for generation of a lane change traveling route which is a traveling route for changing lanes;
during lane change, selecting one lane marking from a lane marking on a left side and a lane marking on a right side of the own lane, as a reference lane marking, based on an effectiveness determination result of the lane marking information of each lane marking; and
during lane change, generating the lane change traveling route which is a traveling route for changing lanes, based on the lane marking information of the reference lane marking.

* * * * *